US012668478B2

(12) United States Patent
Fantappie et al.

(10) Patent No.: US 12,668,478 B2
(45) Date of Patent: Jun. 30, 2026

(54) BEVERAGE DISPENSER CONSUMABLE SYSTEMS AND METHODS

(71) Applicant: PepsiCo, Inc., Purchase, NY (US)

(72) Inventors: Giancarlo Fantappie, Rancho Palos Verdes, CA (US); Steven Jersey, Laguna Niguel, CA (US); Andrew Forbes, Cambridge (GB); Charles Kilby, St Neots (GB); Andrew Taylor, Cambridge (GB); Alexander David Norman, Cambridge (GB); Thomas Edward Parker, London (GB); Hollie Louise Anna Jennings, Cambridge (GB); Julia Burke, New York, NY (US); Carlos Gonzalez, Sunnyside, NY (US)

(73) Assignee: PepsiCo, Inc., Purchase, NY (US)

( * ) Notice: Subject to any disclaimer, the term of this patent is extended or adjusted under 35 U.S.C. 154(b) by 394 days.

(21) Appl. No.: 18/314,533

(22) Filed: May 9, 2023

(65) Prior Publication Data

US 2023/0373774 A1 Nov. 23, 2023

Related U.S. Application Data

(60) Provisional application No. 63/364,367, filed on May 9, 2022.

(51) Int. Cl.
*B67D 1/00* (2006.01)

(52) U.S. Cl.
CPC ......... *B67D 1/0042* (2013.01); *B67D 1/0069* (2013.01); *B67D 2001/0092* (2013.01); *B67D 2210/0001* (2013.01)

(58) Field of Classification Search
CPC ................ B67D 1/0042; B67D 1/0069; B67D 2210/0001; B67D 2001/0092;
(Continued)

(56) References Cited

U.S. PATENT DOCUMENTS

| | | | | |
|---|---|---|---|---|
| 682,923 A * | 9/1901 | Eaton | A47F 5/0037 248/137 |
| 1,166,833 A * | 1/1916 | Hazard | A47G 23/0241 248/141 |

(Continued)

FOREIGN PATENT DOCUMENTS

| | | |
|---|---|---|
| CN | 204219905 U | 3/2015 |
| CN | 110732180 A | 1/2020 |

(Continued)

OTHER PUBLICATIONS

International Search Report and Written Opinion for International Application No. PCT/US2023/066732, Commissioner for Patents, United States, mailed on Jan. 11, 2024, 11 pages.

*Primary Examiner* — Devin K Barnett
(74) *Attorney, Agent, or Firm* — Sterne, Kessler, Goldstein & Fox P.L.L.C.

(57) ABSTRACT

Aspects of the present disclosure include a water filter mount for a beverage dispenser. The water filter mount releasably mounts a water filter to the beverage dispenser using a rotating motion that does not require any tools. Aspects of the present disclosure also include a gas cylinder mount for a beverage dispenser. The gas cylinder mount releasably mounts a water filter to the beverage dispenser using a rotating motion that does not require any tools. Aspects of the present disclosure also include a concentrate vial mount for a beverage dispenser. The concentrate vial releasably mounts a water filter to the beverage dispenser using a rotating motion that does not require any tools.

6 Claims, 23 Drawing Sheets

(58) Field of Classification Search
CPC ........ A47F 5/0892; A47F 5/0037; A47F 5/08; A47F 5/0081; A47F 5/03; A47F 7/00; A47F 7/0021; A47F 7/28; A47F 7/285; A47G 25/746; A47G 23/02; A47G 23/0241; A47B 73/00; A47B 81/007; A47B 81/00; A47B 46/00
See application file for complete search history.

(56) References Cited

U.S. PATENT DOCUMENTS

| | | | | |
|---|---|---|---|---|
| 2,602,700 A * | 7/1952 | Ryan | B65D 83/386 | 222/162 |
| 3,220,613 A * | 11/1965 | Palmer | B65D 83/184 | 222/509 |
| 3,345,977 A * | 10/1967 | Hall | B65G 51/02 | 211/113 |
| 3,791,403 A * | 2/1974 | Folkerth | F17C 13/084 | 211/85.18 |
| 3,809,319 A * | 5/1974 | Kimura | B65D 83/388 | 239/274 |
| 4,111,338 A * | 9/1978 | Cheng | B65D 83/386 | 239/282 |
| 4,276,984 A * | 7/1981 | Simmons | A47F 5/0087 | D7/708 |
| 4,317,551 A * | 3/1982 | Bishop | A47G 23/0241 | 248/141 |
| 4,445,495 A * | 5/1984 | Frost | F24C 3/14 | 114/191 |
| 4,971,257 A * | 11/1990 | Birge | B65D 83/182 | 222/402.15 |
| 5,082,149 A * | 1/1992 | Cross | B05B 11/1087 | 222/162 |
| 5,997,082 A * | 12/1999 | Vincent | B60N 3/102 | 248/311.2 |
| 6,237,812 B1 * | 5/2001 | Fukada | B65D 83/75 | 222/402.12 |
| 6,494,549 B2 * | 12/2002 | Van Daalwyk | F17C 13/084 | 312/45 |
| 7,261,268 B2 * | 8/2007 | Kunesh | B65D 83/388 | 248/311.2 |
| 8,573,553 B2 * | 11/2013 | Stephan | B60N 3/102 | 211/80 |
| 9,060,654 B2 * | 6/2015 | Wegelin | A47K 5/12 | |
| 9,651,188 B2 * | 5/2017 | Green | F16L 55/07 | |
| 10,638,868 B1 * | 5/2020 | Straight | A47J 27/002 | |
| 10,799,901 B2 * | 10/2020 | Langsdale | B65D 83/388 | |
| 11,857,069 B1 * | 1/2024 | Coronado | A47B 73/008 | |
| 12,017,000 B2 * | 6/2024 | Landis | A61M 16/0066 | |
| 12,116,257 B1 * | 10/2024 | Bilton | B67D 1/0021 | |
| 2001/0020606 A1 * | 9/2001 | Battaglia | A47F 5/005 | 211/74 |
| 2003/0029977 A1 * | 2/2003 | Kim | F17C 13/084 | 248/230.8 |
| 2006/0113237 A1 * | 6/2006 | Jenkins | F25D 23/126 | 210/238 |
| 2007/0090071 A1 * | 4/2007 | Campbell | B67D 3/0083 | 211/81 |
| 2009/0269933 A1 * | 10/2009 | Yamaguchi | H01L 21/67742 | 438/758 |
| 2010/0065484 A1 * | 3/2010 | Bruggink | C02F 9/20 | 210/232 |
| 2011/0220559 A1 | 9/2011 | Joo et al. | | |
| 2011/0266279 A1 * | 11/2011 | Wattel | B66C 3/00 | 248/224.8 |
| 2013/0014964 A1 * | 1/2013 | Yoshida | A62C 99/0018 | 169/89 |
| 2016/0136547 A1 * | 5/2016 | Nuss | C02F 1/003 | 210/91 |
| 2019/0039005 A1 * | 2/2019 | Suthar | B01D 35/306 | |
| 2019/0256337 A1 * | 8/2019 | Bhutani | B67D 1/0057 | |
| 2019/0293239 A1 * | 9/2019 | Frenal | G05B 15/02 | |
| 2020/0180932 A1 | 6/2020 | Gulati et al. | | |
| 2020/0361758 A1 * | 11/2020 | Fantappié | B67D 1/10 | |
| 2022/0021290 A1 * | 1/2022 | Mills | G21B 3/004 | |
| 2022/0024748 A1 * | 1/2022 | Fantappie | B67D 1/04 | |
| 2022/0024781 A1 | 1/2022 | Keel et al. | | |
| 2022/0034515 A1 * | 2/2022 | Erisgen | F24C 3/082 | |
| 2023/0109966 A1 * | 4/2023 | Deslandes | B01F 23/23611 | 261/65 |
| 2023/0249350 A1 * | 8/2023 | Ha | B25J 15/0038 | 414/222.02 |
| 2023/0302418 A1 * | 9/2023 | Gröning | B01F 35/2116 | |
| 2023/0406507 A1 * | 12/2023 | Sindezingue | B64D 11/02 | |
| 2024/0219025 A1 * | 7/2024 | Lapeyre | A47J 37/0763 | |
| 2024/0219221 A1 * | 7/2024 | Zhao | G01G 21/22 | |
| 2024/0328580 A1 * | 10/2024 | Pemberton | F17C 13/084 | |
| 2025/0376367 A1 * | 12/2025 | Burke | B01D 35/306 | |

FOREIGN PATENT DOCUMENTS

| | | |
|---|---|---|
| CN | 112028134 A | 12/2020 |
| WO | WO-2023220564 A2 | 11/2023 |

* cited by examiner

BEVERAGE DISPENSER CONSUMABLE SYSTEMS AND METHODS

FIELD

This disclosure relates to beverage dispensers. Specifically, this disclosure relates to systems and methods for connecting consumable items to a beverage dispenser.

BACKGROUND

Beverage dispensers are used to provide beverages to users on demand. All beverage dispensers include some consumables that are depleted as beverages are dispensed. Examples of beverage dispenser consumables include beverage concentrate, carbonation gas, and water filters. The time and effort required to replace these consumables affects the beverage dispenser's operational efficiency because the beverage dispenser must have the appropriate consumables available for full functionality Some beverage dispensers are intended to be serviced by technicians, who are typically trained in the process required to replace consumables. Other beverage dispensers are intended for use in light commercial or home settings, where consumable replacement is typically done by an end user (e.g., an office manager or a home owner). In either case, reducing the time and effort needed to replace the consumables improves dispenser productivity and efficiency. In situations where the servicing is accomplished by an end user, it is even more important to simplify the consumable replacement process because the end user is not typically trained in beverage dispenser servicing. Thus, there exists a need for simplified consumable mounting systems that improve consumable servicing in beverage dispensers.

BRIEF SUMMARY

An aspect of the present disclosure includes a water filter mount for a beverage dispenser, the water filter mount including a base; a manifold pivotably mounted to the base such that the manifold can be pivoted outwards from the base from a closed position into a loading position; and a filter head attached to the manifold, the filter head configured to receive an end of a water filter and to fluidly connect an interior of the water filter with the manifold. The base comprises first and second protrusions that are configured to be received by a groove in the water filter when the water filter is inserted into the filter head and the water filter and filter head are pivoted into a closed position.

An aspect of a method of mounting a water filter in a beverage dispensing machine according the present disclosure includes inserting an end of a water filter into a filter head that is part of a manifold, the manifold pivotably attached to a base and rotating the water filter and filter head with respect to the base from a loading position into a closed position such that a groove on the water filter receives a pair of protrusions disposed on the base.

An aspect of the present disclosure includes a gas cylinder mount for a beverage dispenser, the gas cylinder mount including first and second side plates disposed parallel to each other; a manifold pivotably mounted to the first and second side plates such that that the manifold can be pivoted outwards from the first and second side plates from a closed position into a loading position; a gas cylinder receptacle disposed in the manifold, the gas cylinder receptacle configured to receive a valve of a gas cylinder; a gas cylinder receiver linked to the manifold and configured to releasably receive a flange of the gas cylinder; first and second tracks disposed in each of the first and second side plates, respectively; first and second guide protrusions connected to the gas cylinder receiver, each of the first and second guide protrusions received by one of the first and second tracks, respectively; and a gas regulator disposed in the manifold and configured to selectively fluidly connect an interior of the gas cylinder with the manifold.

An aspect of a method of mounting a gas cylinder in a beverage dispensing machine, according to the present disclosure includes inserting a valve of the gas cylinder into a receptacle disposed in a manifold that is pivotably attached to first and second side plates, where a flange of the gas cylinder is seated in a receiver linked to the manifold when inserting the valve; and rotating the gas cylinder and the manifold with respect to the first and second side plates from a loading position into a closed position.

An aspect of the present disclosure includes a concentrate vial mount for a beverage dispenser, the concentrate vial mount including a base; a head pivotably mounted to the base such that the head can be pivoted outwards from the base from a closed position into a loading position, wherein the head is configured to receive a vial cap to fluidly connect the concentrate vial with the beverage dispenser. The base comprises first and second protrusions that are configured to be received by a groove in the vial cap when the concentrate vial is inserted into the vial head pivoted into the closed position.

An aspect of a method of mounting a concentrate vial in a beverage dispenser according to the present disclosure includes inserting a cap of a concentrate vial into a head that is pivotably attached to a base; rotating the concentrate vial and head with respect to the base from a loading position into a closed position such that a groove on the cap receives a pair of protrusions disposed on the base.

BRIEF DESCRIPTION OF THE DRAWINGS

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION

Figure 1:
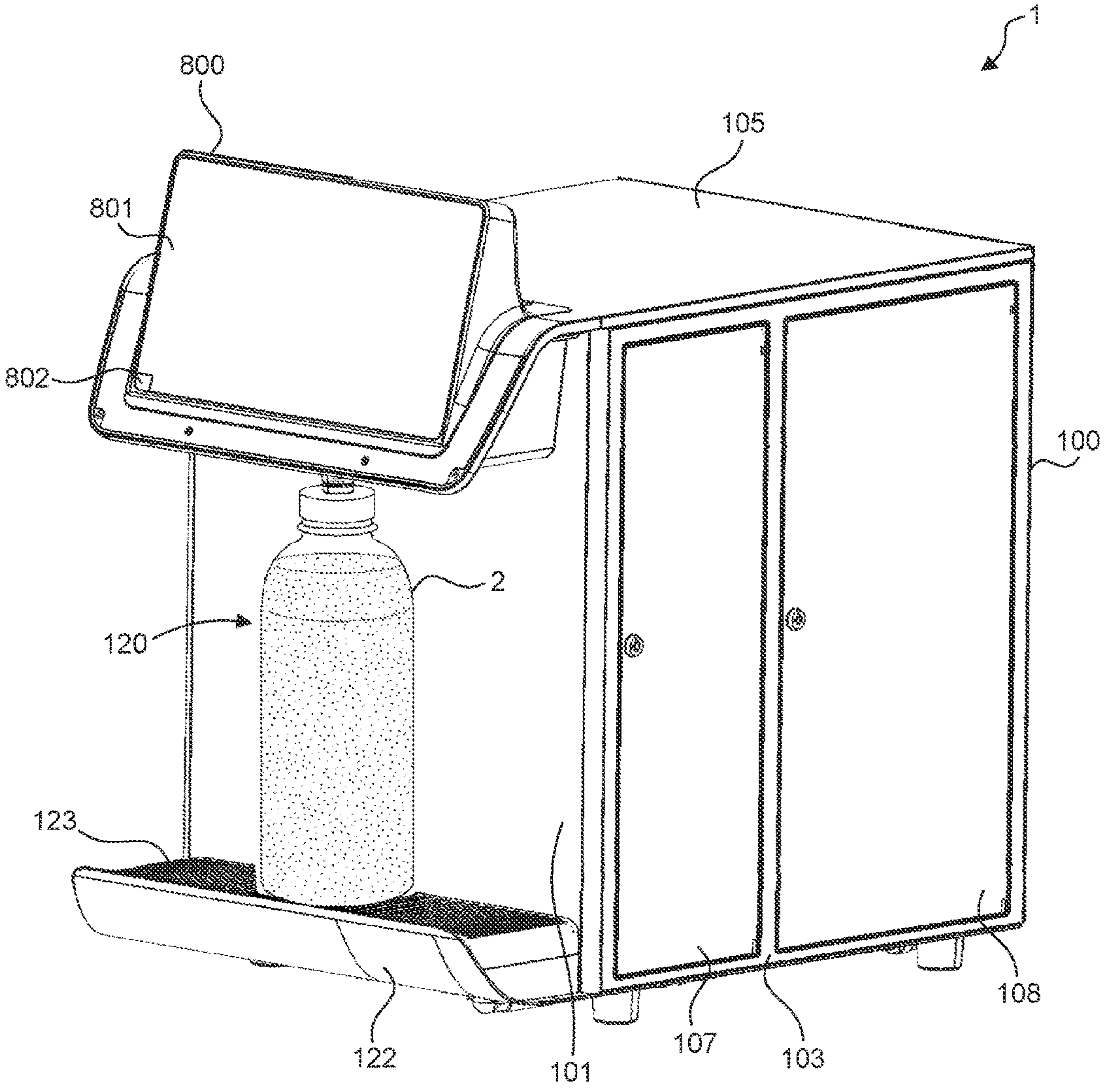
FIG. 1 is a perspective view of a beverage dispenser according to an aspect.

Reference will now be made in detail to representative aspects illustrated in the accompanying drawings. References to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspect whether or not explicitly described.

Simplifying the replacement of beverage dispenser consumables improves dispenser operational efficiency by reducing system downtime. It also improves the end user experience in situations where the beverage dispenser is serviced by the end user, such as in light commercial or home settings. Thus, aspects of the present disclosure include simplified connection systems and methods for water filters, gas cylinders, and concentrate vials. These connection systems provide a secure, fluid/gas-tight connection between the consumable and the beverage dispenser. The connection systems are also easy to use, require no separate tools for servicing, and involve only a few motions that can be accomplished quickly to remove and replace the consumable. Finally, the connection systems provide both visual and tactile indications that confirm that the consumable is properly connected, which further improves the replacement process.

Referring to FIGS. 1-4, an aspect of a beverage dispenser 1 includes a housing 100. As illustrated in the Figures, housing 100 (also called cladding 100) may be formed as a rectangular prism, with a front wall 101, rear wall 102, right wall 103, left wall 104, top wall 105, and bottom wall 106 (collectively, "the housing walls"). Housing 100 may also be formed in non-rectangular shapes, such as cylindrical, spherical, or other prismatic shapes with more than six sides. The housing walls may be formed from one continuous element, or may be formed from multiple elements (e.g., sheets of metal, or plastic partitions) joined together. Furthermore, the housing walls may include openings to access the interior of housing 100, and may also include attachment points for elements mounted on the exterior or interior surfaces of the walls. The housing walls may be formed from any suitable material, including, for example, aluminum, steel, and plastic materials. The housing walls may be joined together using any suitable method, such as adhesives, welding, or mechanical fastening or connectors.

Figure 2:
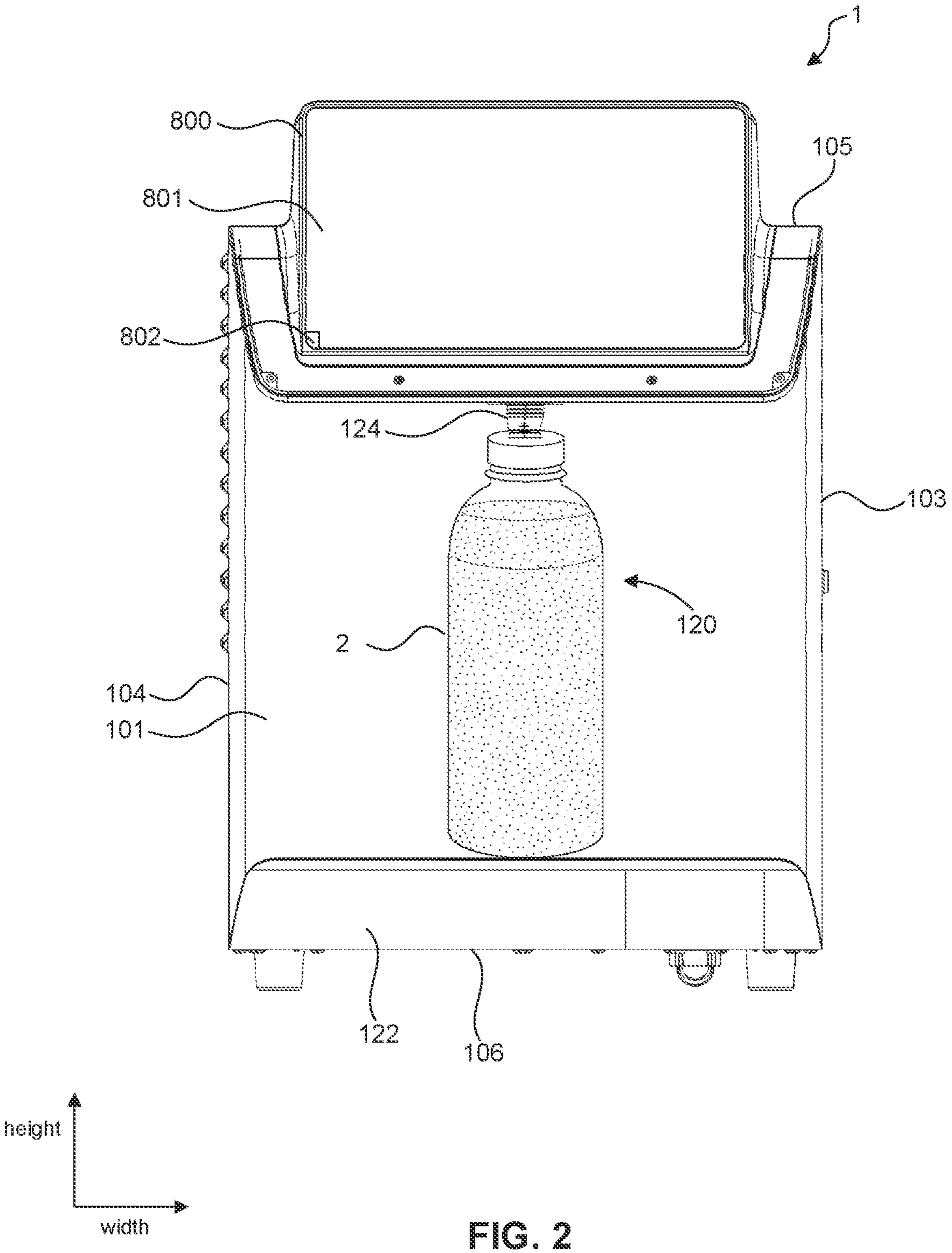
FIG. 2 is a front view of a beverage dispenser according to an aspect.
Figure 3:
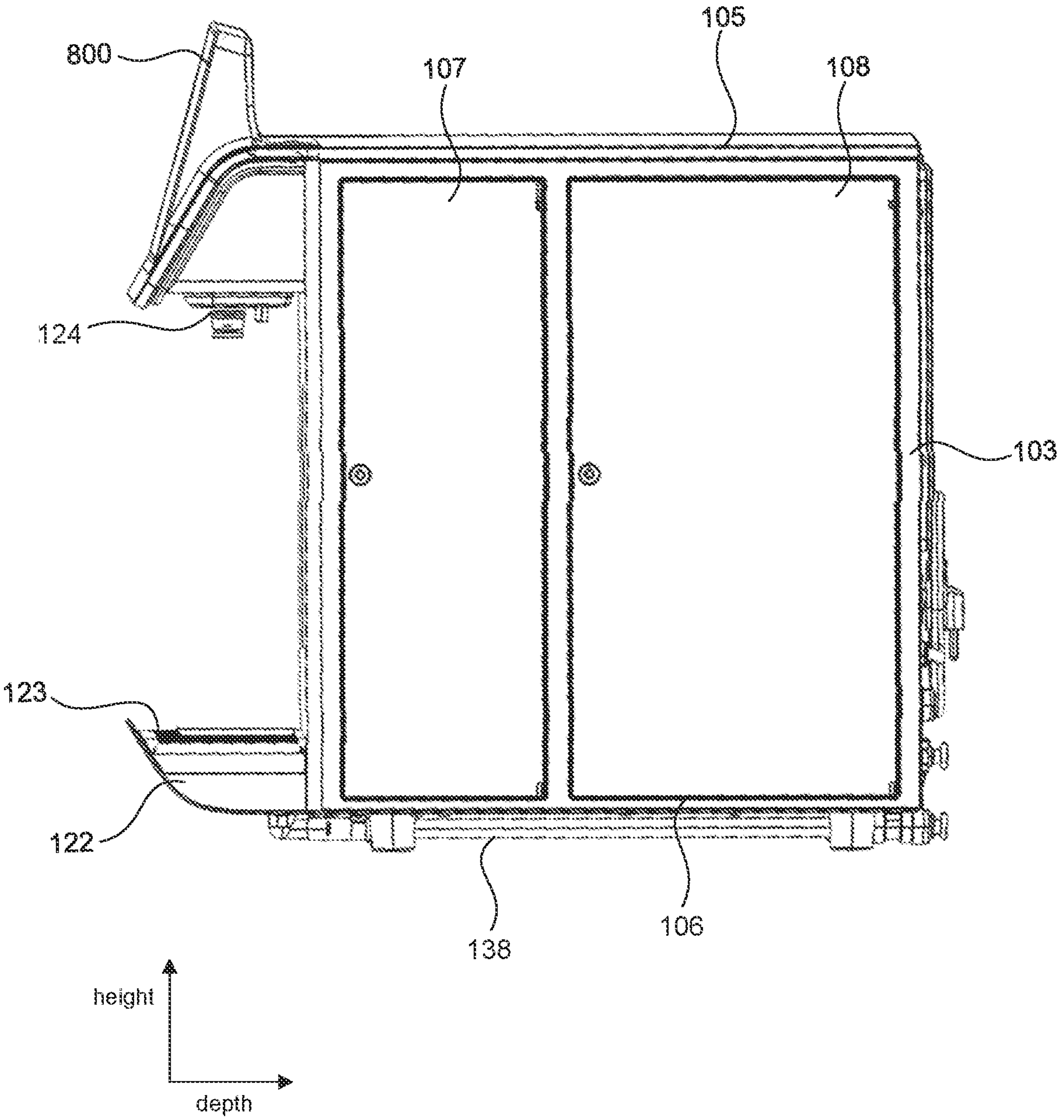
FIG. 3 is a side view of a beverage dispenser according to an aspect.

For purposes of this disclosure and solely for ease of reference, directions as illustrated in FIGS. 2-3 are defined as follows. The height direction is the direction extending perpendicular to top wall 105 and bottom wall 106, the width direction is the direction extending perpendicular to right wall 103 and left wall 104, and the depth direction is the direction extending perpendicular to front wall 101 and rear wall 102.

In some aspects, housing 100 may be sized to be suitable for placement in a non-typical dispenser location, such as, for example, on a countertop in an office pantry, break-room or home kitchen. Counters have a standard depth of 60 centimeters (23.6 inches). Most kitchens counters have wall-cabinets built above the counters at a height that, in some cases, is as low as 16 inches. In addition, space on the counter is limited and a dispenser larger than 18 inches would be too wide for most home kitchens. For those reasons, in some aspects, housing 100 may not exceed 16 inches in the height direction, 18 inches in the width direction, and 23 inches in the depth direction. Furthermore, in these aspects beverage dispenser 1 may weigh less than 45 pounds without any onboard removable consumables present. These aspects have the advantage or being easily positioned in non-typical locations, such as the aforementioned countertops. As will be discussed in detail below, these compact aspects of beverage dispenser 1, include all components required to dispense a beverage inside housing 100. Specifically, none of the consumables (e.g., beverage concentrate, CO2 gas canisters, alkaline chambers and water filters) or dispensing elements (e.g., pumps, valves) are located outside of housing 100. These aspects of beverage dispenser 1 still require an external connection to power and water source to function.

As best shown in FIGS. 1 and 2, beverage dispenser 1 includes a dispensing zone 120 that is configured to receive a container 2. A nozzle 124 is disposed on front wall 101 in the dispensing zone 120. A drip tray 122 is also disposed on front wall 101 in dispensing zone 120. Drip tray 122 includes a surface 123 configured to support container 2 under nozzle 124 while it is being filled. Surface 123 includes openings to form a grid that allow any drips or spills to drain through surface 123 into the body of drip tray 122. A display 800 is also disposed on front wall 101 above nozzle 124. Display 800 can be used to control aspects of the operation of beverage dispenser 1 and to display information regarding the operation of beverage dispenser 1.

Figure 3A:
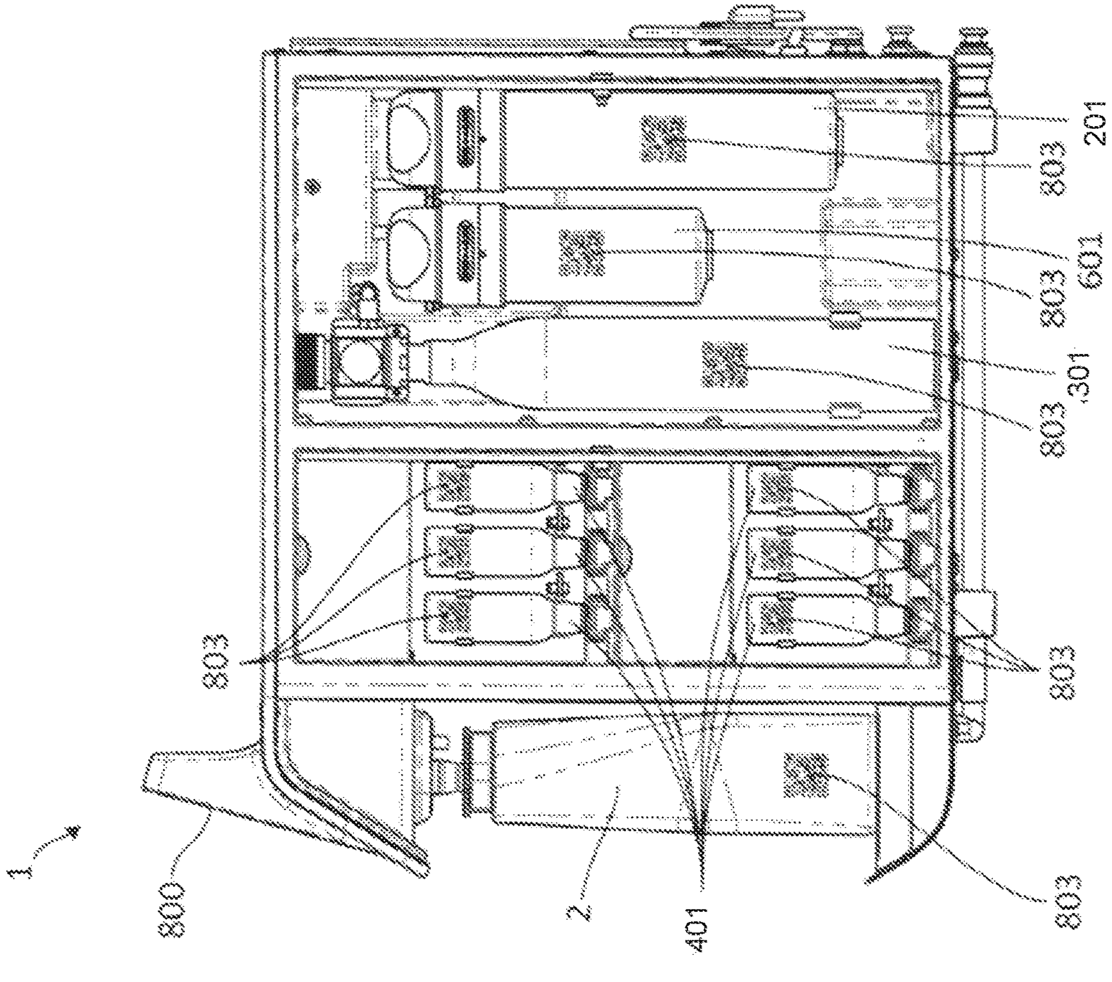
FIG. 3A is the side view of FIG. 3 showing replaceable consumables, according to an aspect.

As shown in FIGS. 3 and 3A, in some aspects, housing 100 includes one or more removable panels or doors that allow access to an interior of housing 100 from the exterior. For example, in some aspects housing 100 includes access doors 107 and 108 (on right wall 103). Access doors 107 and 108 (collectively, "the access doors") cover openings in their corresponding walls that enable a user to access the interior of housing 100 to access the replaceable consumables of beverage dispenser 1. The access doors may be made from any suitable material and are removably fastened to their corresponding wall using hinges, mechanical fasteners, or any other suitable method for removably attaching the access doors. Doors may be locked in the closed position with keys or stay in the closed position with a magnet or other latching mechanisms. FIG. 3A is the side view of FIG.

3 with access doors 107 and 108 removed to show an example arrangement of the removable consumables accessible through the access doors. As shown in FIG. 3A, inside access door 107 six concentrate containers 401 are shown, and inside access door 108 one CO2 gas cylinder 301, one alkaline chamber 601 and one water filter 201 are shown. Each of these consumables are easily accessible and quick replaceable by any unskilled user when empty or exhausted, as will be described in detail below. The number and type of consumables present in housing 100 can vary depending on the features and capabilities present in a specific aspect of beverage dispenser 1.

Figure 4:
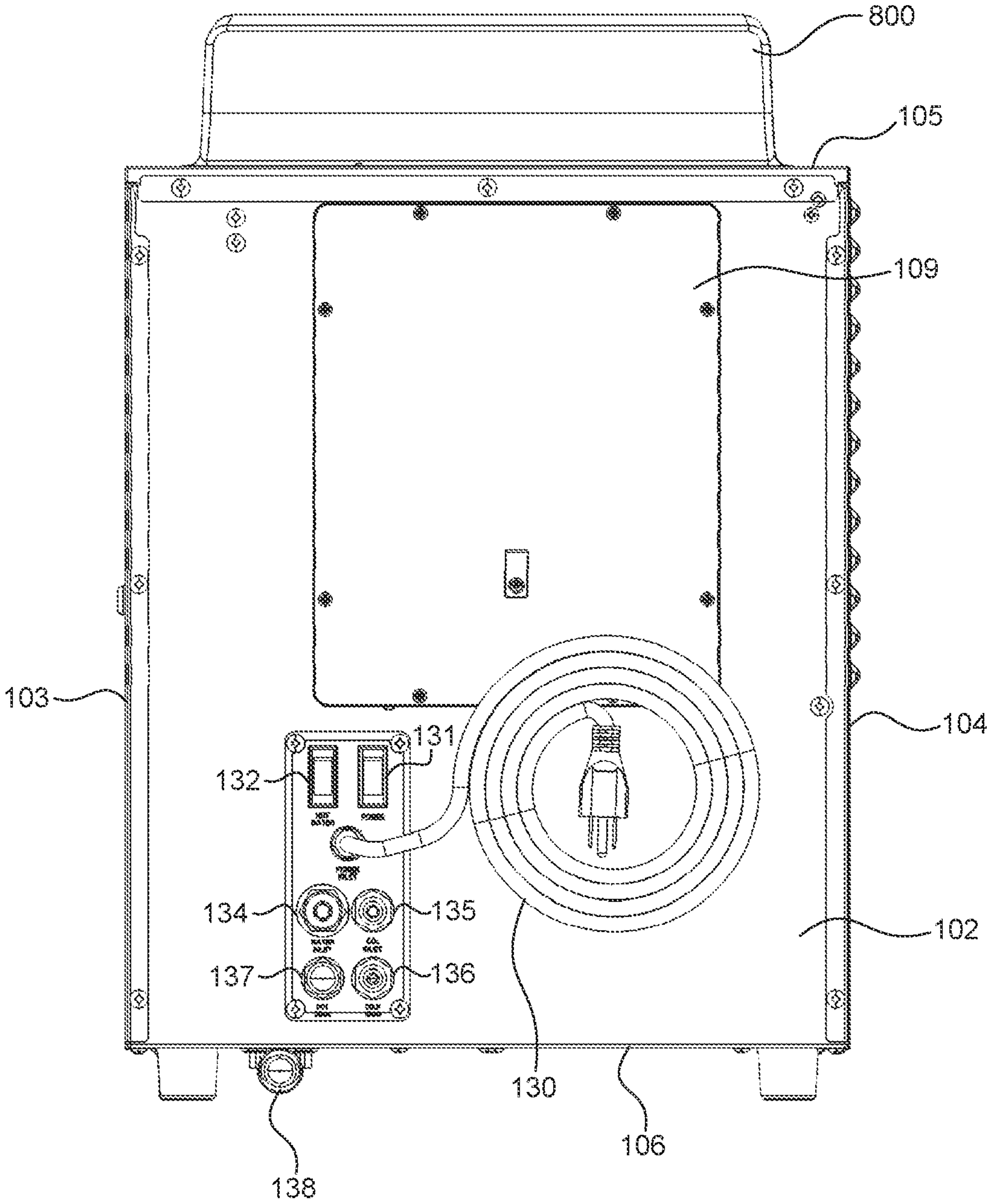
FIG. 4 is a rear view of a beverage dispenser according to an aspect.

As shown in FIG. 4, in some aspects rear wall 102 may include various external connections. Visible in the aspect shown in FIG. 4 is a power cord 130 that is configured to plug in to a suitable outlet to provide power to beverage dispenser 1. A power switch 131 and a hot water switch 132 control the flow of power to elements of beverage dispenser 1. A water inlet 134 is provided on rear wall 102 to receive ambient water from a water source. A CO2 inlet 135 is also provided on rear wall 102 to receive an external source of CO2 for carbonation purposes, if internal CO2 gas cylinder 301 is deemed insufficient for a large community of people in a large office space. A cold water drain 136 and hot water drain 137 are also located on rear wall 102 to drain the water bath of the internal chiller and the hot water from the hot water tank, respectively, anytime the dispenser must be moved, relocated, or re-packaged and transported. Finally, a drip tray drain 138 is also shown in FIGS. 3 and 4. Some of these connections may be optional in some aspects of beverage dispenser 1. In addition, an access door 109 (on rear wall 102) serves to provide maintenance access for servicing interior components of housing 100, such as the main PCB board and the IoT communication board for cell, wireless and, bluetooth connectivity.

Figure 6:
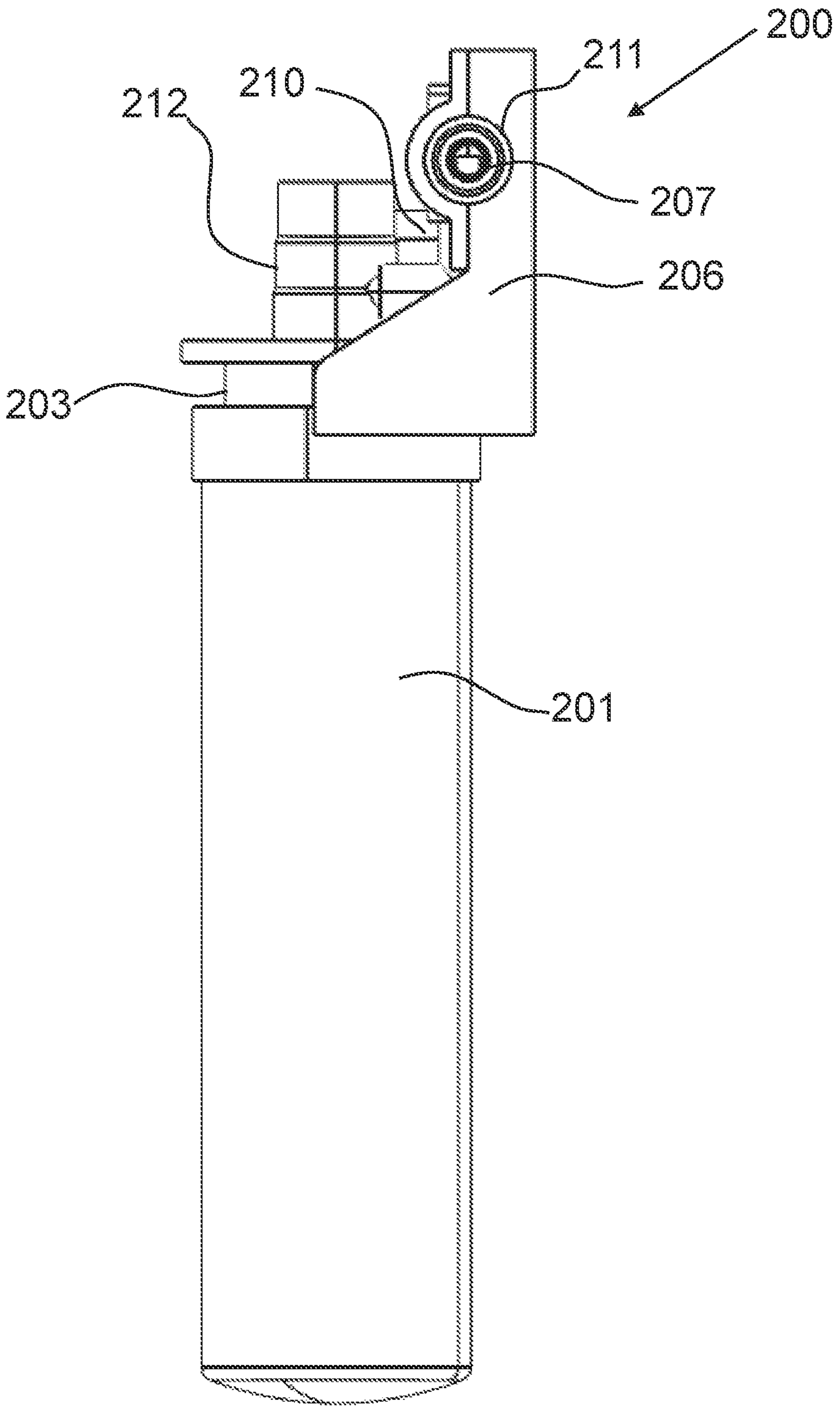
FIG. 6 is a side view of a water filter assembly in a first configuration according to an aspect.
Figure 7:
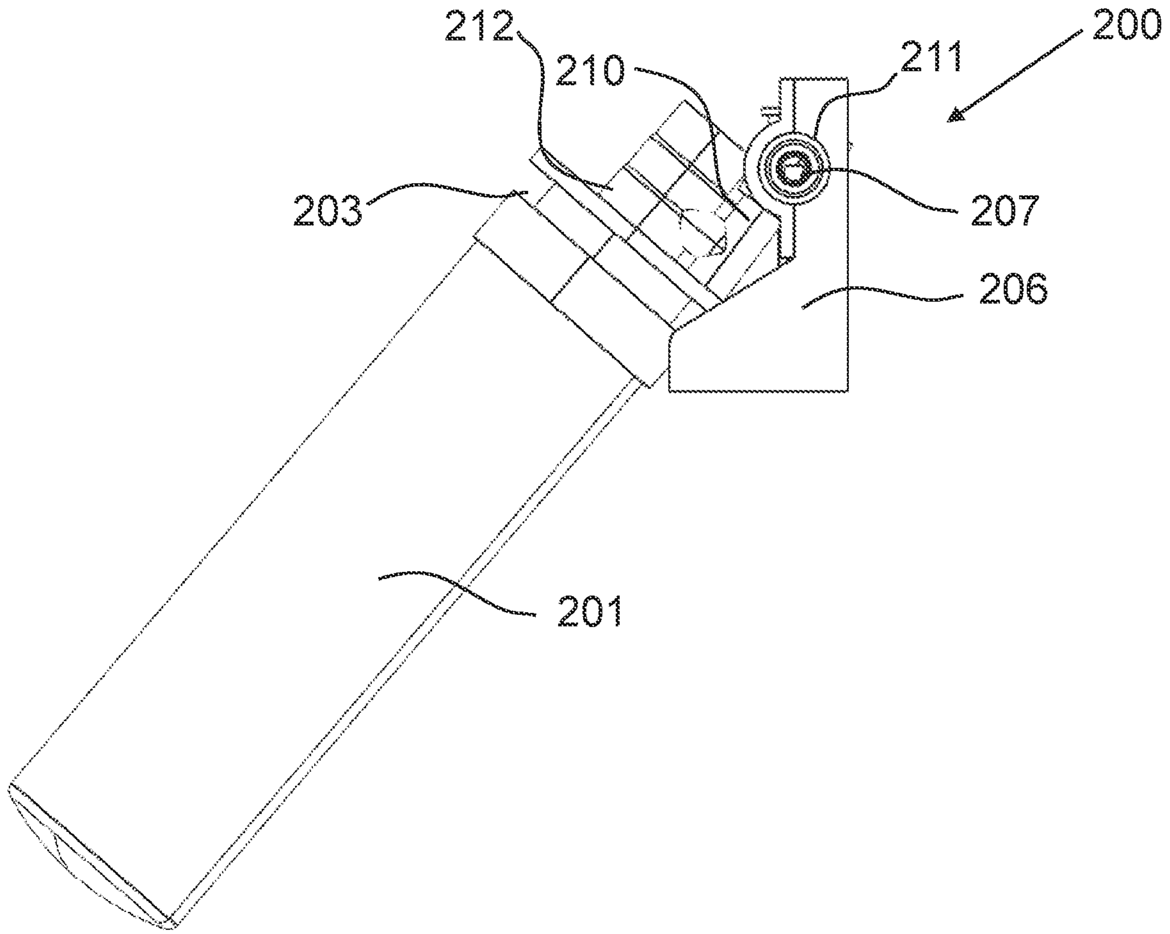
FIG. 7 is side view of a water filter assembly in a second configuration according to an aspect.
Figure 8:
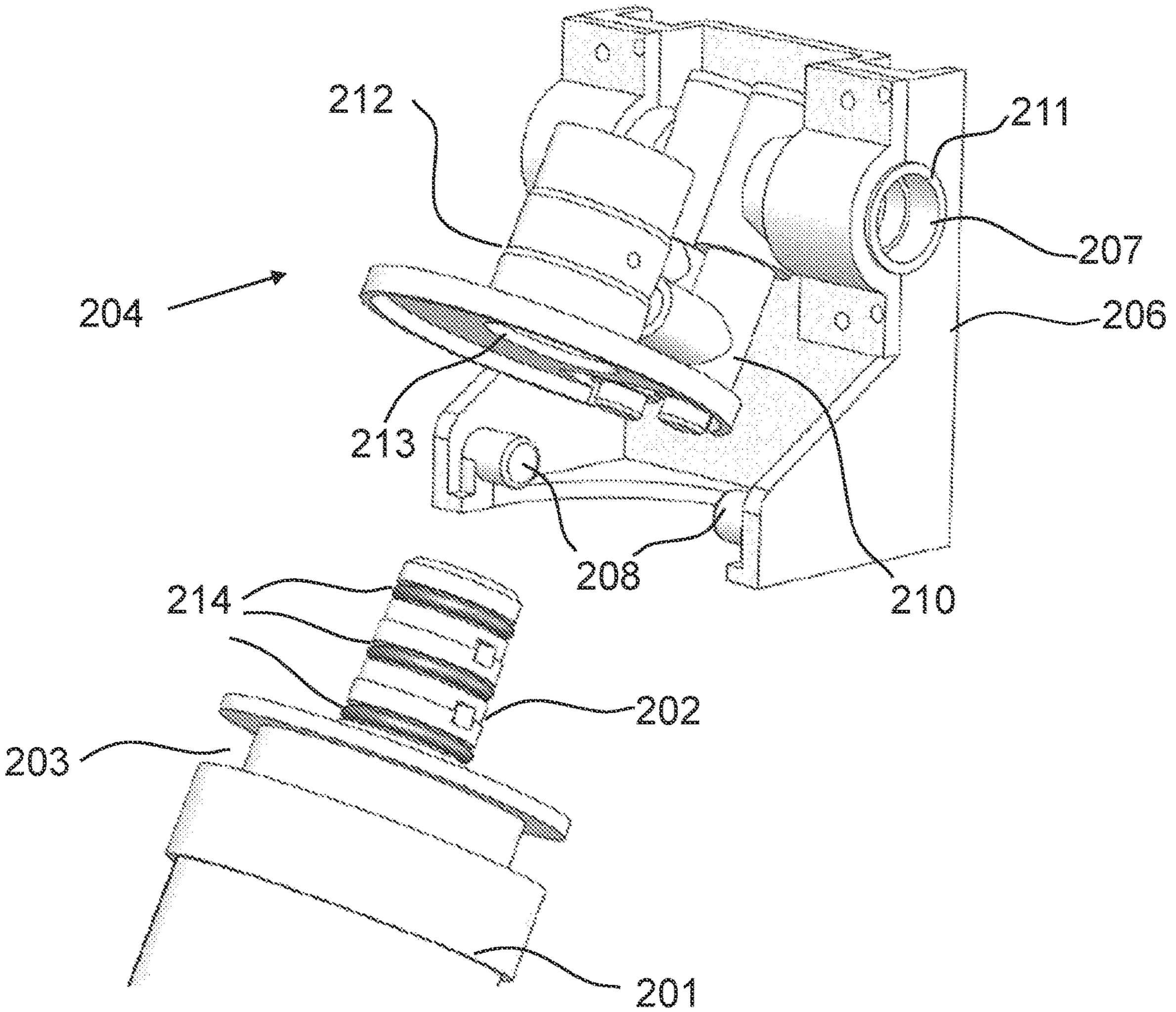
FIG. 8 is a detail view of a portion of a water filter assembly according to an aspect.

An aspect of a water filter assembly 200 is shown in FIGS. 5-9. Water filter assembly 200 includes a water filter mount 204 that receives a water filter 201 (as seen in FIG. 8). Water filter 201 is configured to receive water and to filter unwanted contaminant from the water to provide a filtered water for us by beverage dispenser 1. Water filter mount 204 includes a water filter base 206 that secures water filter assembly 200 to beverage dispenser 1. Water filter base 206 can be connected to beverage dispenser 1 through any suitable method, such as mechanical fasteners that are passed through water filter base 206 and secured to an appropriate structure in beverage dispenser 1.

Figure 5:
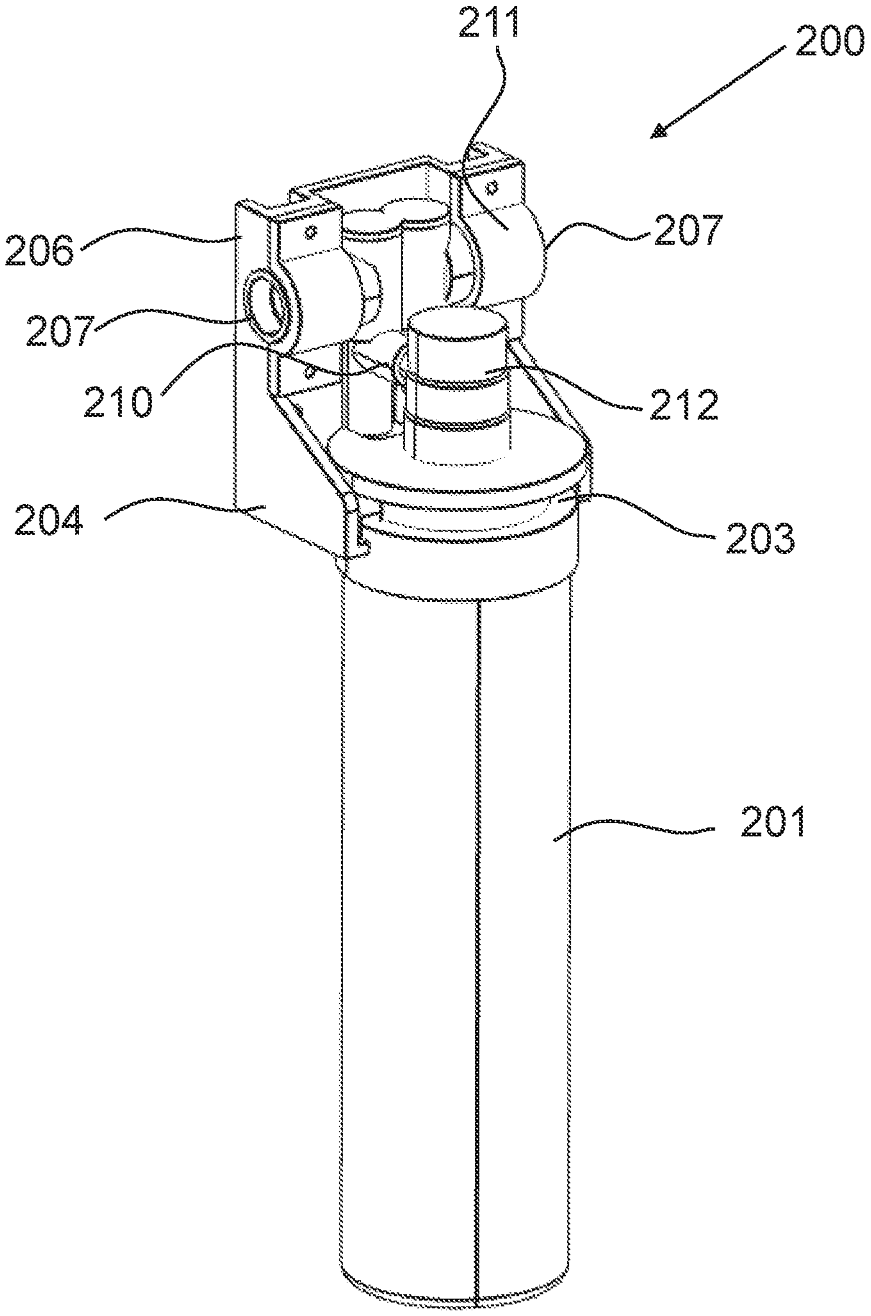
FIG. 5 is a perspective view of a water filter assembly according to an aspect.

Water filter base 206 also pivotably or rotatably supports water filter manifold 210. As seen in FIGS. 6-7, water filter manifold 210 is attached to water filter base 206 at a water filter manifold pivot 211. In these aspects, cylindrical portions of water filter manifold 210 are received into corresponding cylindrical portions of water filter manifold pivot 211 to allow water filter manifold 210 to pivot with respect to water filter base 206. As shown in FIG. 5, in some aspects water filter manifold pivot 211 is disposed in an upper portion of water filter base 206. Specifically, as will be discussed in detail below, water filter manifold pivot 211 is disposed above a pair of water filter groove protrusions 208 that are disposed in the lower portion of water filter base 206.

A water filter head 212 is connected to water filter manifold 210. Water filter head 212 is configured to receive water filter 201. In an aspect, water filter head 212 has a receptacle 213 that receives a corresponding protrusion 202 disposed at an end of water filter 201. Water filter head 212 is configured to fluidly connect the interior of water filter 201 with water filter manifold 210. Water filter manifold 210, in turn, has a pair of water filter fluid connections 207 that are configured to fluidly connect water filter assembly 200 to the plumbing connections of beverage dispenser 1. In aspects as shown in FIGS. 5-9, water filter fluid connections 207 are integrated into water filter manifold pivot 211. Specifically, the cylindrical protrusions of water filter manifold 210 that extend into water filter manifold pivot 211 also act as water filter fluid connections 207. Thus, water filter fluid connections 207 are coaxially located with water filter manifold pivot 211. These water filter fluid connections 207 may have appropriate fittings to interact with tubing or piping, such as threads or push-connect elements. Aligning water filter fluid connections 207 coaxially with water filter manifold pivot 211 saves space and simplifies the plumbing connections needed in water filter base 206.

Water filter head 212 or water filter manifold 210 may also include a suitable valve or valves that are configured to close off the fluid connection between water filter fluid connections 207 and water filter head 212 when water filter 201 is not inserted into water filter head 212. This ensures that water from beverage dispenser 1 does not exit water filter head 212 during the replacement process. Actuation of this valve may be accomplished by the movement of a protrusion 202 of water filter 201 into water filter head 212 (e.g., the end of water filter 201 pushes the valve open from a spring-loaded closed position).

Figure 9:
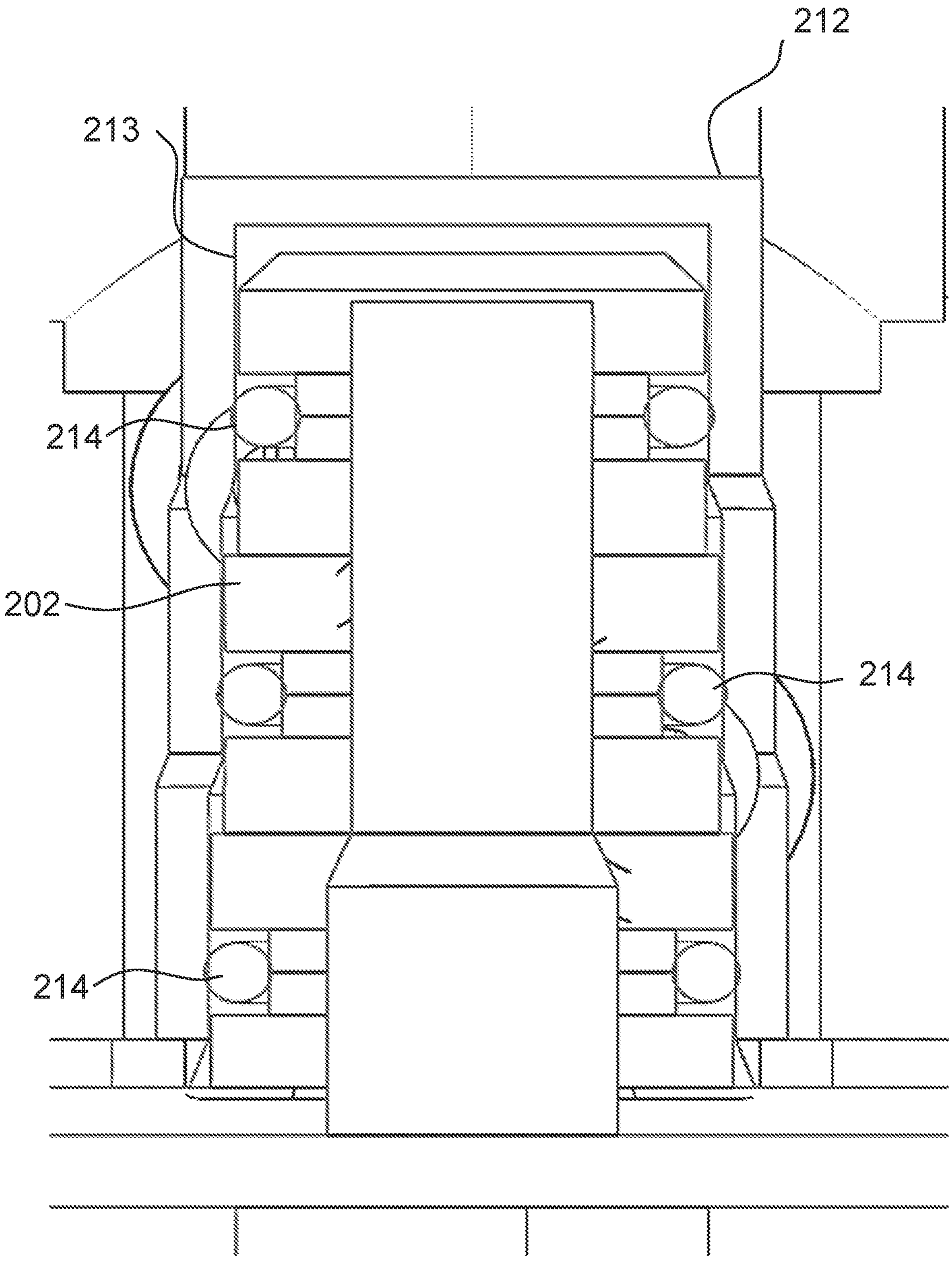
FIG. 9 is a cross section of a portion of a water filter assembly according to an aspect.

In the aspect shown in FIGS. 8-9, three water filter seals 214 are disposed around protrusion 202 of water filter 201. These water filter seals 214 mate with the internal surface of receptacle 213 of water filter head 212, as shown in the cross-section of FIG. 9. In these aspects, both protrusion 202 and receptacle 213 are cylindrical in shape and have varying diameters along their lengths that correspond to the placement of each of water filter seals 214 (i.e., the cylinders of protrusion 202 and receptacle 213 are stepped). For example, each water filter seal 214 may correspond to a different diameter, with the diameters decreasing with each step closer to the end of protrusion 202. Receptacle 213 has diameters that correspond to the different diameters of protrusion 202 such that each water filter seal 214 contacts the internal surface of receptacle 213. Although three water filter seals 214 are shown there may be two, four, five, or more water filter seals 214. Arranging multiple seals in this manner has the advantage of ensuring appropriate sealing of water filter 201 in water filter mount 204 while reducing insertion and removal effort of water filter 201 from water filter head 212.

As shown in FIGS. 3 and 4, water filter 201 is inserted into water filter head 212 when water filter head 212 (and water filter manifold 210) are rotated outwards away from water filter base 206 into a loading position. This loading position is selected to allow for easy removal of water filter 201 without interference from other elements, including other portions of water filter assembly 200 or other elements of beverage dispenser 1 that are located close to water filter assembly 200. For example, the loading position may be rotated such that the centerline of water filter head forms an angle of between 20 and 60 degrees with the rear surface of water filter base 206. In other examples, the loading position may be rotated such that the centerline of water filter head forms an angle of between 30 and 45 degrees with the rear surface of water filter base 206. The angle associated with the loading position can be controlled by designing the contact point between portions of water filter manifold 210 and water filter base 206 or by inclusion of stops in water filter manifold pivot 211.

After water filter 201 is secured in water filter head 212, water filter 201 and water filter head 212 are rotated to a closed position as shown in FIG. 6. In the closed position the centerline of water filter 201 is approximately parallel to the back surface of water filter base 206. As seen in FIG. 5 and FIG. 8, water filter groove protrusions 208 disposed on either side of water filter base 206 are received by a water filter groove 203 disposed on water filter 201. Water filter groove protrusions 208 and water filter groove 203 are constructed to retain water filter 201 in water filter assembly 200 by preventing water filter 201 from dropping downwards with respect to FIGS. 5 and 6 because water filter groove protrusions 208 are captured by water filter groove 203. Water filter groove protrusions 208 also help prevent water filter 201 from rotating out of the closed position by exerting a clamping force on water filter groove 203. In some aspects, the seating of water filter groove protrusions 208 in water filter groove 203 may be configured to create an audible or tactile (i.e., physically felt) indication that water filter 201 is fully seated. For example, the shape of water filter groove 203 may be configured to produce a clicking sound when water filter groove protrusions 208 are fully seated.

The elements of water filter assembly 200 discussed above can be constructed from any suitable material, including, for example, metal and plastic materials.

A method of replacing water filter 201 from water filter assembly 200 according to the above aspects begins with used water filter 201 being connected to water filter assembly 200 in the closed position, as shown in FIGS. 5 and 6. Used water filter 201 is rotated upwards into the loading position (as shown in FIG. 7) by grasping used water filter 201 and pulling upwards. Used water filter 201 is then removed from water filter head 212 by pulling water filter 201 away from water filter head 212 (see FIG. 8). Valves in water filter head 212 or water filter manifold 210 prevents water from leaking out of water filter assembly 200 after used water filter 201 is removed. New water filter 201 is then inserted into water filter head 212. Finally, new water filter 201 is rotated into the closed position (as shown in FIGS. 5 and 6), where water filter groove protrusion 208 are captured by water filter groove 203, thereby retaining new water filter 201. This service process requires no separate tools, and with practice can be accomplished in only a handful of seconds by an end user.

A gas cylinder assembly 300 according to an aspect is shown in FIGS. 10-15. Gas cylinder assembly 300 includes a gas cylinder 301 that has a gas cylinder valve 302 disposed at one end of gas cylinder 301. Gas cylinder 301 is configured to store pressurized gas to be used for carbonating beverages in beverage dispenser 1. In some aspects, gas cylinder 301 may store a liquid form of the relevant gas (e.g., liquid CO2) that is released from gas cylinder valve 302 as a high-pressure gas.

A gas cylinder mount 310 serves to physically and fluidly connect gas cylinder 301 to beverage dispenser 1. Gas cylinder mount 310 is seen in isolation in FIG. 12. Gas cylinder mount 310 includes a pair of side plates 312 oriented parallel to each other. A gas cylinder manifold 320 is mounted to side plates 312 in the space defined between side plates 312. Gas cylinder manifold 320 is rotatably or pivotably mounted to side plates 312 at a gas cylinder manifold pivot 316. Gas cylinder manifold 320 includes cylindrical protrusions that are received by gas cylinder manifold pivot 316 disposed in side plates 312 to facilitate the pivoting mounting of gas cylinder manifold 320. At least one of these protrusions is also a gas cylinder manifold fluid connection 318 that is configured to fluidly connect the interior of gas cylinder manifold 320 with beverage dispenser 1. Gas cylinder manifold fluid connection 318 is therefore coaxially located with gas cylinder manifold pivot 316, which reduces plumbing requirements and complexity for gas cylinder mount 310. Gas cylinder manifold fluid connection 318 may be configured with a suitable gas-tight connection, such as threads or push-connect style connection.

Figure 12:
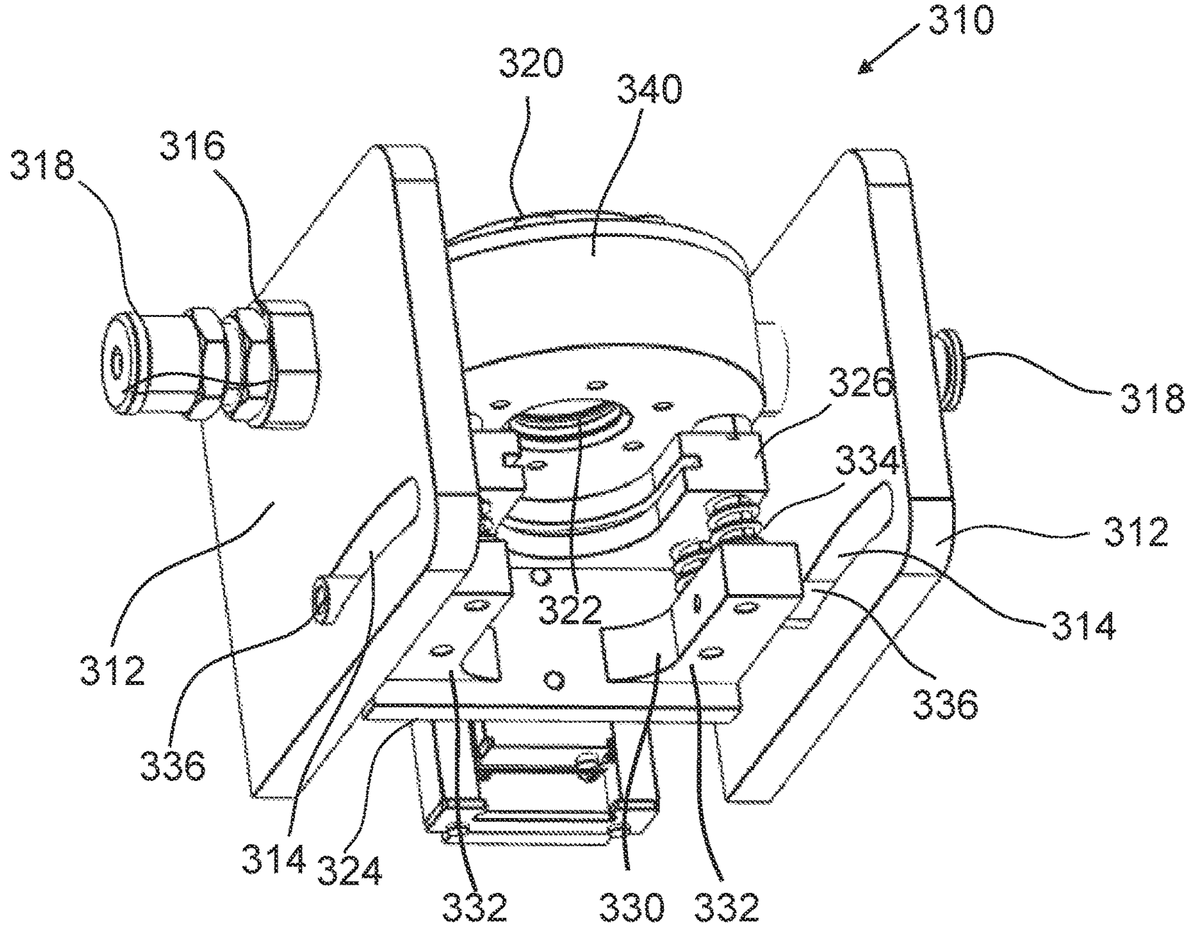
FIG. 12 is a perspective view of a gas cylinder mount according to an aspect.

Gas cylinder manifold 320 includes a gas cylinder receptacle 322 disposed in an underside of gas cylinder manifold 320 (as best seen in FIG. 12). Gas cylinder receptacle 322 is configured to receive gas cylinder valve 302 to fluidly connect gas cylinder manifold 320 with an interior of gas cylinder 301.

Figure 13:
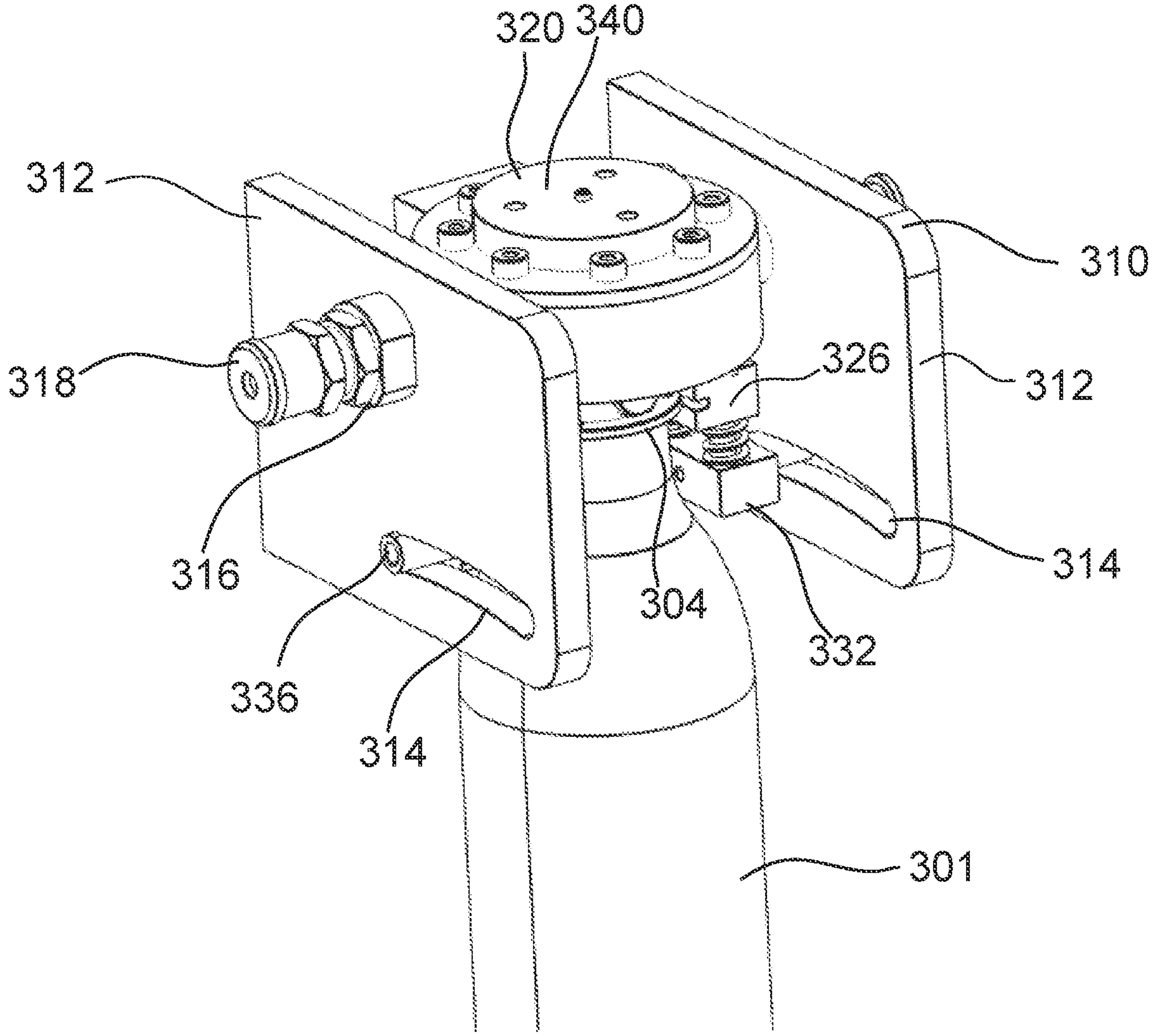
FIG. 13 is perspective view of a gas cylinder assembly in a first configuration according to an aspect.

Gas cylinder manifold 320 is attached to a gas cylinder manifold plate 324 that extends downwards from gas cylinder manifold 320 (i.e., in the direction that includes gas cylinder receptacle 322). As can be seen in FIGS. 12 and 13, gas cylinder tensioning assembly 330 includes a pair of supports 332 that are fixed to a bottom portion of gas cylinder manifold support plate 324 and that extend horizontally away from gas cylinder support plate 324. A pair springs 334 are fixed to each of the supports 332 that all four springs 334 extend upwards (i.e., towards gas cylinder manifold 320). A gas cylinder receiver 326 is attached to the other end of springs 334 below gas cylinder manifold 320. Gas cylinder receiver 326 includes a u-shaped gas cylinder groove 327 that is configured to receive a corresponding gas cylinder flange 304 on gas cylinder 301 when gas cylinder 301 is loaded into gas cylinder mount 310. Gas cylinder groove 327 is mounted to the ends of the springs opposite of supports 332 such that gas cylinder groove 327 is spring loaded to move upwards (i.e., towards gas cylinder manifold 320). In this way, the end of gas cylinder 301 that is inserted into gas cylinder receptacle 322 is pushed into gas cylinder receptacle 322 by the action of gas cylinder tensioning assembly 330.

Figure 14:
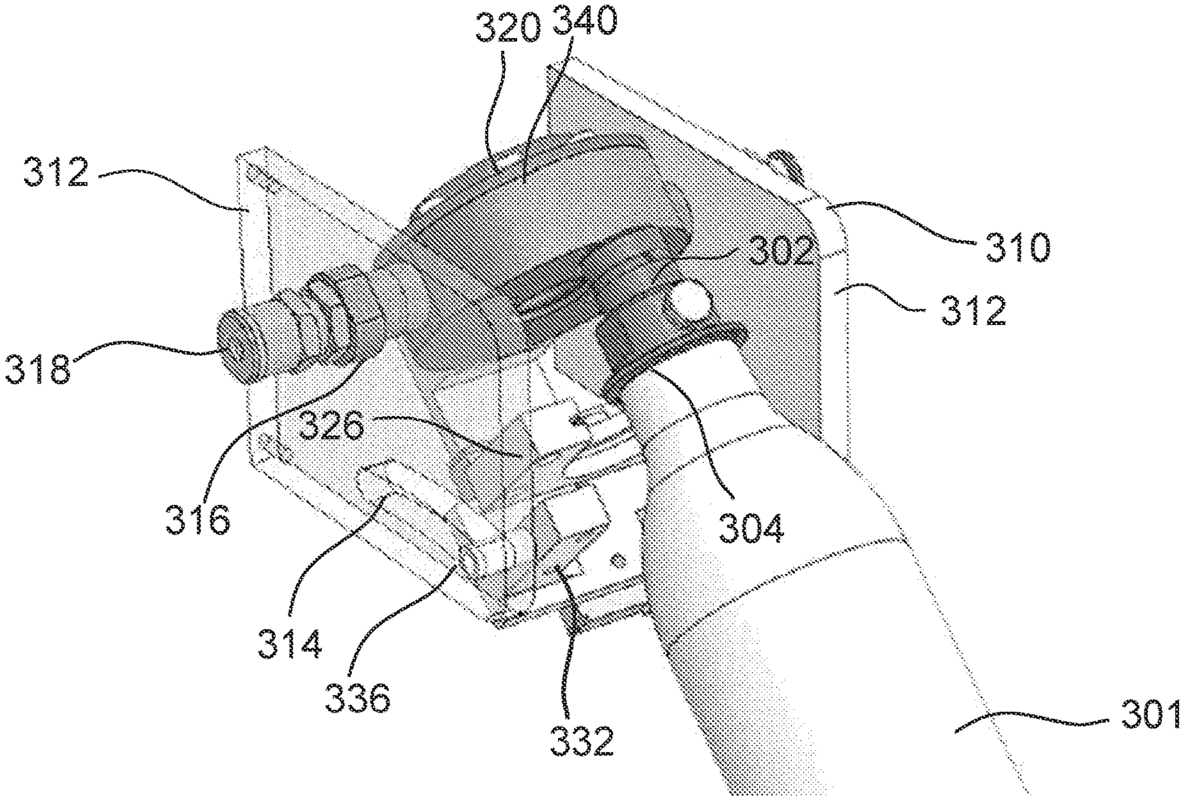
FIG. 14 is a perspective view of a gas cylinder assembly in a second configuration according to an aspect.

Gas cylinder tensioning assembly 330 also includes two guide protrusions 336, one of which is disposed on each of supports 332. Guide protrusion 336 extend laterally outwards from each protrusion 332 and extend through tracks 314 in gas cylinder side plates 312. Tracks 314 define the path that guide protrusions 336 take as gas cylinder manifold 320 (and attached components) transition from the closed position (as shown in FIG. 13) to the loading position (as shown in FIG. 14). For example, the loading position may be rotated such that the centerline of gas cylinder manifold 320 forms an angle of between 20 and 60 degrees with the rear surface of gas side plates 312. In other examples, the loading position may be rotated such that the centerline of gas cylinder manifold 320 forms an angle of between 30 and 45 degrees with the rear surface of gas side plates 312. The angle associated with the loading position is controlled by the extent of tracks 314. As shown in FIG. 13, the closed position is located such that the centerline of gas cylinder manifold 320 is approximately parallel to the rear surface of gas side plate 312.

Gas cylinder valve 302 also a gas cylinder seal 306 that is configured to contact an interior surface of gas cylinder receptacle 322 to create a gas-tight seal when gas cylinder 301 is loaded into gas cylinder assembly 300.

Gas manifold 320 also includes a gas regulator 340. Gas regulator 340 is configured to regulate the gas exiting gas cylinder 301 to a useable pressure for beverage dispenser 1. In an aspect, the gas exiting gas cylinder 301 may have a pressure as high as 3000 PSI. Gas regulator 340 can be configured to reduce that pressure to between 60 to 80 PSI. In one aspect, gas regulator 340 can be a standard diaphragm-type regulator.

Figure 15:
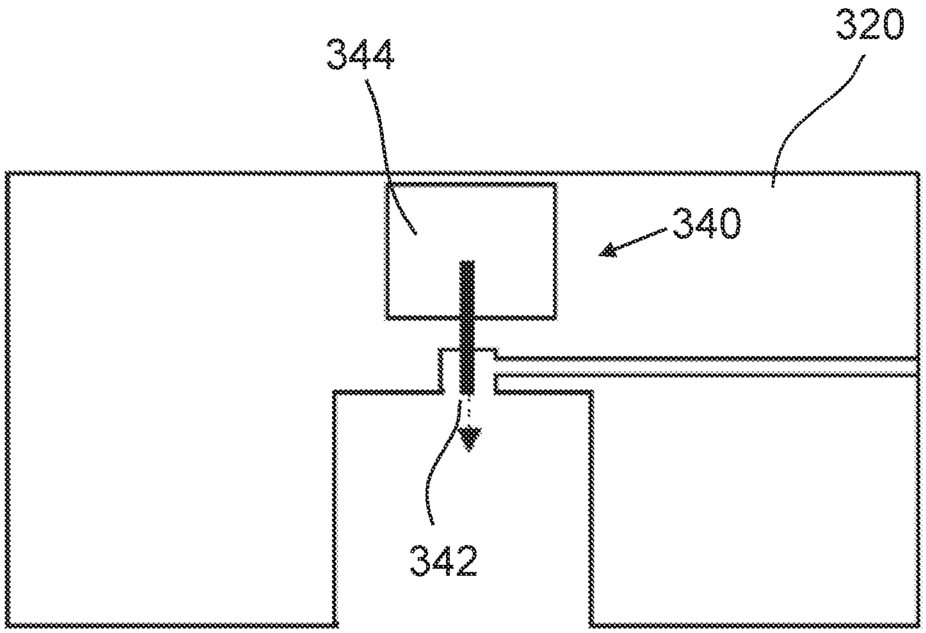
FIG. 15 is a schematic of a gas cylinder regulator.

Another aspect of gas regulator 340 is shown schematically in FIG. 15. In this aspect, a regulator pin 342 is actuated by a regulator actuator 344. Regulator pin 342 can be moved into and out of receptacle 322 to contact a gas cylinder valve pin 308 disposed in the end of gas cylinder 301. When regulator pin 342 is extended it contacts and depresses gas cylinder valve pin 308, and gas is allowed to flow into gas cylinder manifold 320 and to gas cylinder manifold fluid connection 318. When regulator pin 342 is withdrawn upwards (i.e., towards regulator actuator 344), gas cylinder valve pin 308 is not depressed and gas does not flow out of gas cylinder 301. Gas regulator 340 only activates gas flow to beverage dispenser 1 when gas is needed (e.g., when a beverage is being dispensed). Once activated, this aspect of gas regulator 340 regulates the pressure and flow of gas through gas cylinder assembly 300 by rapidly actuating regulator pin 342 back and forth to open and close gas cylinder valve pin 308. The cycling of gas cylinder valve pin 308 regulates gas flow down to the required pressure by only permitting limited amounts of gas to flow. This aspect of gas regulator 340 pressurizes the interior of gas cylinder manifold 320 only for the short period of time needed to dispense a beverage. Gas is not allowed to flow from gas cylinder 301 at other times. This has the benefit of reducing potential gas loss caused by leaks in the gas system of beverage dispenser 1. Further, it also means that the seal between gas cylinder valve 302 and gas cylinder receptacle 322 is not subject to the high pressure found in gas cylinder 301, unlike with the standard diaphragm-type regulator. This means that the seal does not need to be as robust because it only needs to seal against a much lower pressure. In turn, the less-robust seal results in lower insertion forces when mounting gas cylinder 301 into gas cylinder assembly 300.

Gas cylinder manifold 320 may also include a suitable valve or valves that are configured to close off the gas connection between gas cylinder fluid connections 318 and gas cylinder manifold 320 when gas cylinder 301 is not inserted into manifold 320. This ensures that gas from beverage dispenser 1 does not exit gas cylinder manifold 320 during the replacement process of gas cylinder 301. Actuation of this valve may be accomplished by the movement of regulator pin 342 by regulator actuator 344. Alternatively, the presence of gas cylinder valve 302 in gas cylinder receptacle 322 may physically actuate the valve open, while the absence gas cylinder valve 302 in gas cylinder receptacle 322 may physically actuate the valve closed.

The elements of gas cylinder assembly 300 discussed above can be constructed from any suitable material, including, for example, metal and plastic materials.

Figure 10:
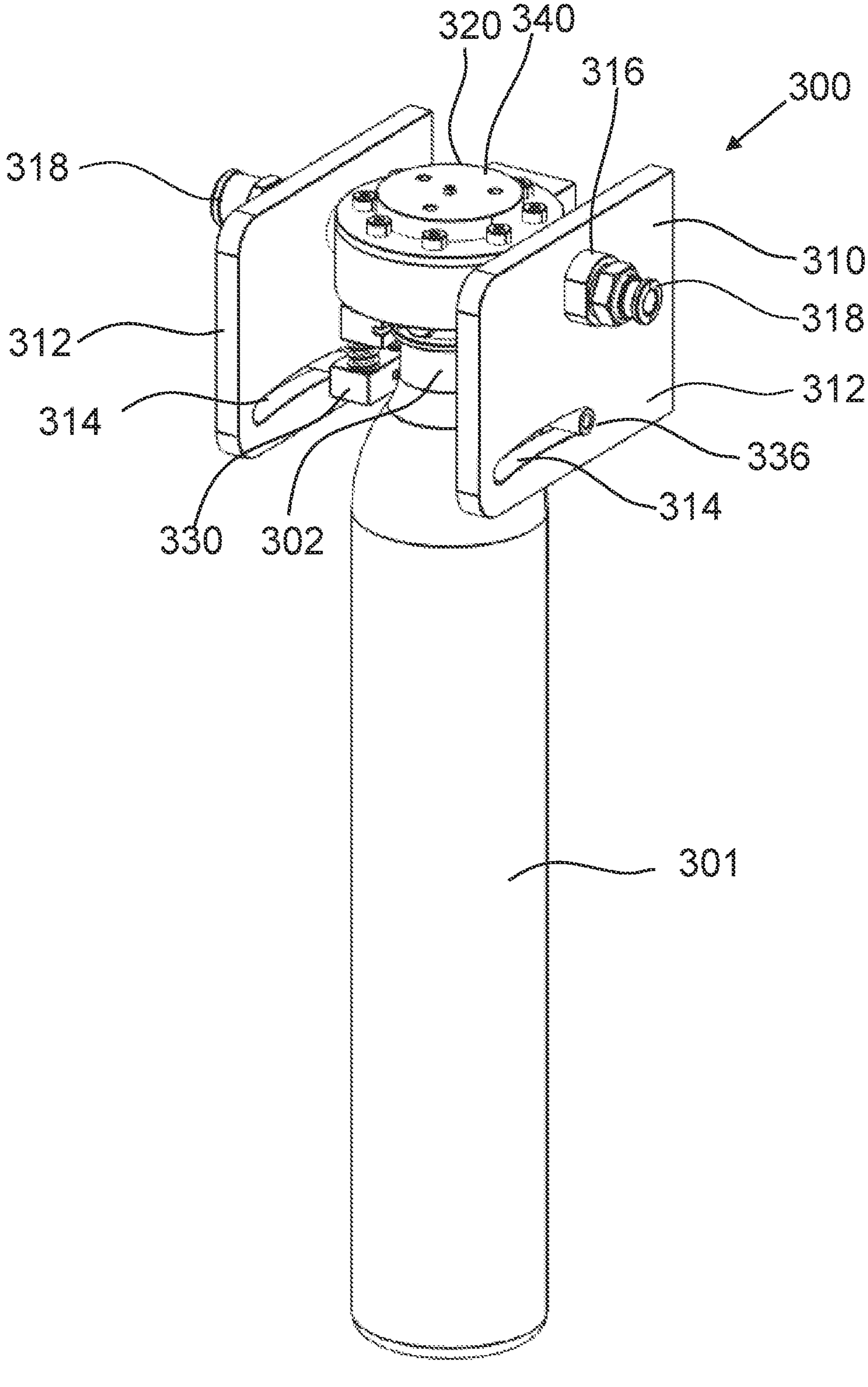
FIG. 10 is perspective view of a gas cylinder assembly according to an aspect.
Figure 11:
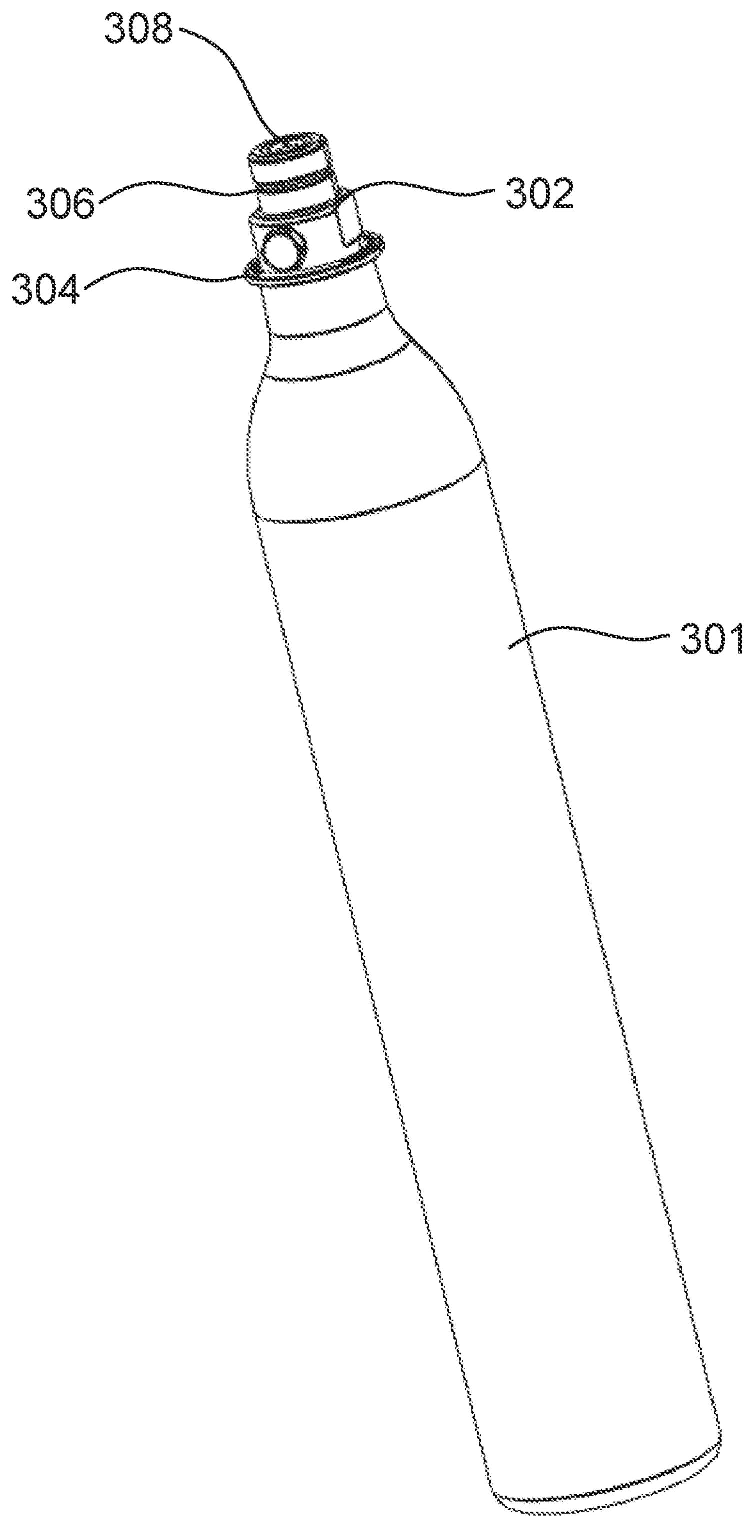
FIG. 11 is a perspective view of a gas cylinder according to an aspect

A method of replacing gas cylinder 301 in gas cylinder assembly 300 according to the above aspects begins with used gas cylinder 301 being connected to gas cylinder assembly 300 in the closed position, as shown in FIGS. 10 and 13. Used gas cylinder 301 is rotated upwards into the loading position (as shown in FIG. 14) by grasping used gas cylinder 301 and pulling upwards. Used gas cylinder 301 is then removed from gas cylinder manifold 320 by pulling gas cylinder 301 away from gas cylinder manifold 320 (see FIG. 14). New gas cylinder 301 is then inserted into gas cylinder manifold 320. Finally, new gas cylinder 301 is rotated into the closed position (as shown in FIGS. 10 and 13), where gas cylinder groove 327 captures gas cylinder flange 306, thereby retaining new gas cylinder 301. Gas cylinder tensioning assembly 330 pressure gas cylinder 301 into gas cylinder receptacle 322. This service process requires no separate tools, and with practice can be accomplished in only a handful of seconds by an end user.

Figure 16:
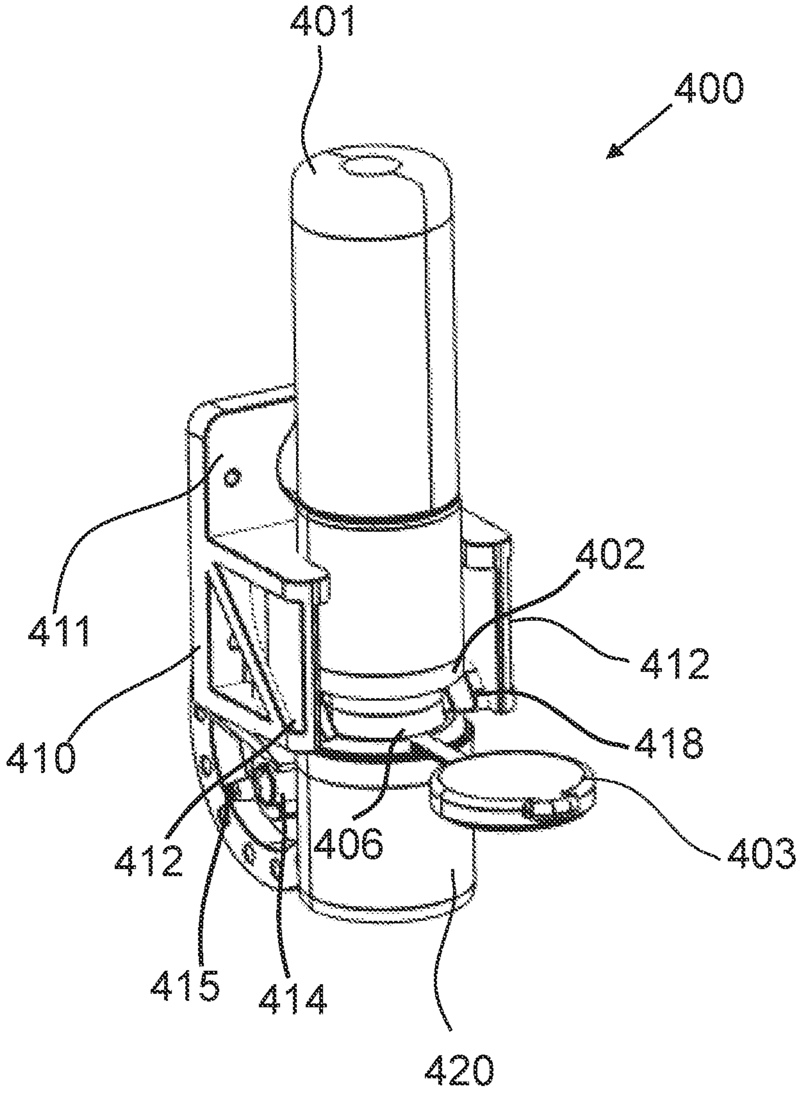
FIG. 16 is a perspective view of a concentrate vial assembly according to an aspect.
Figure 17:
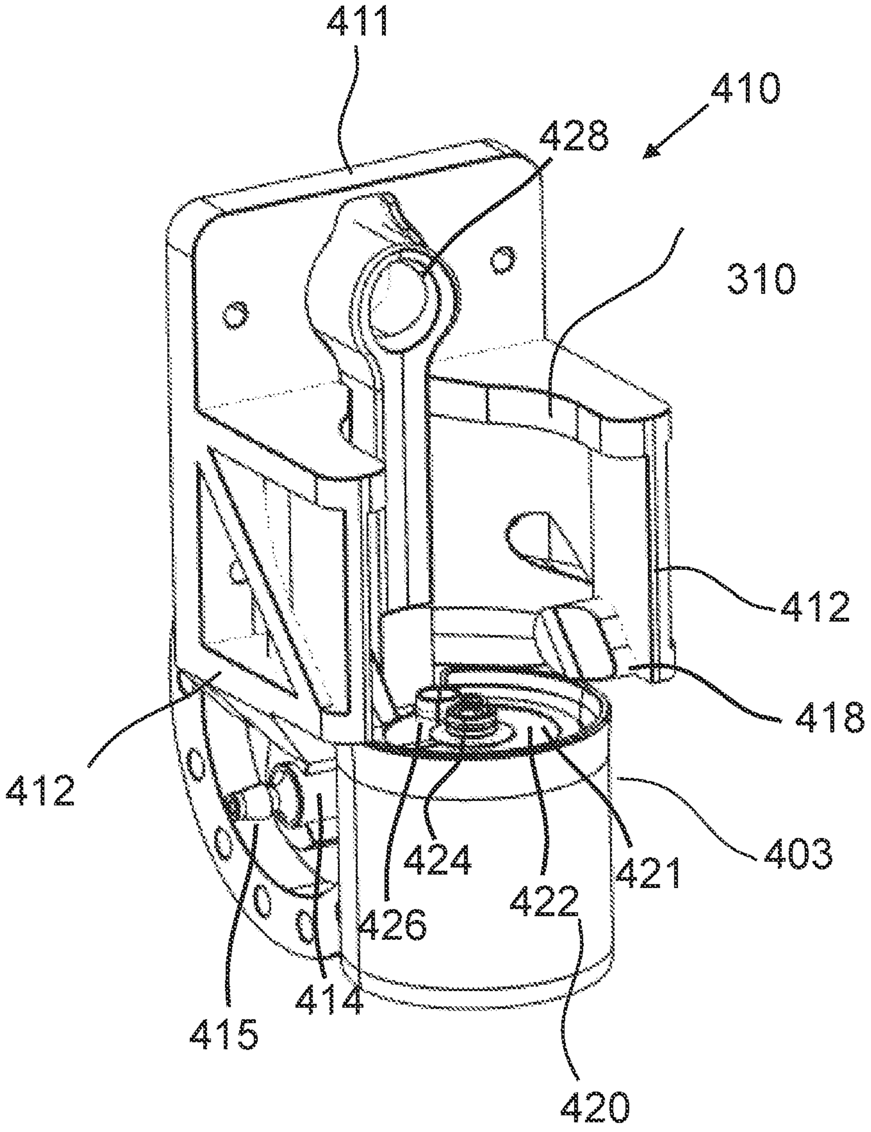
FIG. 17 is a perspective view of a concentrate vial mount according to an aspect.
Figure 18:
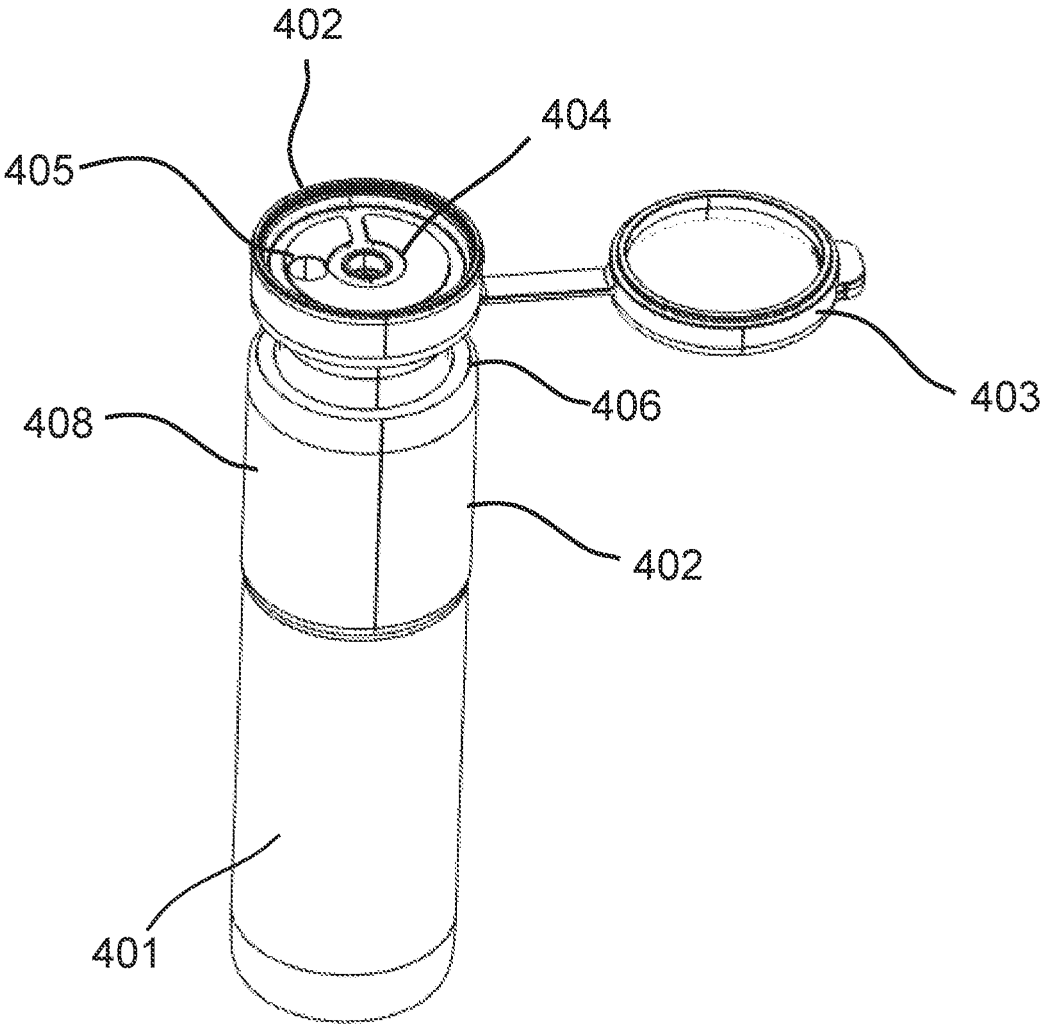
FIG. 18 is a perspective view of a concentrate vial according to an aspect.

A concentrate vial assembly 400 is shown in FIGS. 16-22. Concentrate vial assembly 400 includes a concentrate vial 401 that is removably attached to a vial mount 410. Concentrate vial 401 is configured to store a beverage concentrate for use in dispensing beverages from beverage dispenser 1. As shown in FIG. 18, concentrate vial 401 includes a vial cap 402 fixed to one end of concentrate vial 401. Vial cap 402 interfaces with vial mount 410 as discussed below. Also shown in FIG. 18 is a vial cap lid 403. Vial cap lid 403 is attached to vial cap 402 and acts as a removable cap to protect the interface area of vial cap 402 when concentrate vial 401 is not attached to vial mount 410.

Vial mount 410 is shown in FIG. 17. It includes a vial base 411 that supports the other components of vial mount 410. Vial base 411 is also configured to be attached to beverage dispenser 1 by, for example, mechanical fasteners. Vial base 411 includes a pair of receiving arms 412 that extend outwards from vial base 411. Receiving arms 412 are shaped to define a space between them that is configured to receive concentrate vial 401 (as shown in FIG. 16).

A vial head 420 is pivotably or rotatably attached to vial base 411 at a vial head pivot 414. Cylindrical portions of vial head 420 are captured by vial head pivot 414 to enable rotation of vial head 420 with respect to vial base 411. Vial head 420 is configured to receive vial cap 402 in a vial receptacle 421. Vial receptacle 421 has a cylindrical shape that corresponds to vial cap 402. As shown in FIG. 17, vial receptacle 421 also includes a vial head seal that provides a fluid-tight seal between vial receptacle 421 and vial cap 402. Vial head 420 fluidly connects vial cap 402 (and, thus, concentrate vial 401) with beverage dispenser 1 via vial fluid connections 415. In this aspect, vial fluid connections 415 are located coaxially with vial head pivot 414. This reduces space and plumbing complexity by minimizing the plumbing needed in vial base 411. Vial fluid connections 415 may have any suitable plumbing connection, such as hose barbs or threads, to interface with the plumbing of beverage dispenser 1. As will be discussed below, in some aspects there are two separate vial fluid connections 415. One vial fluid connection 415 is for delivering concentrate from vial assembly 400 to beverage dispenser 1. The other vial fluid connection 415 is for delivering pressurized gas from beverage dispenser 1 to vial assembly 400 for equalizing pressure in concentrate vial 401 as it is used.

Vial head 420 also includes a vial concentrate valve 424. Vial concentrate valve 424 is a normally-closed valve that is actuated open by the presence of vial cap 402 (i.e., vial cap 402 physically opens vial concentrate valve 424 when it is loaded into vial head 420). This ensures that the internal plumbing of beverage dispenser 1 is not exposed to the external environment unless concentrate vial 401 is loaded into vial mount 410.

Vial cap 402 has a cap concentrate valve 404. Cap concentrate valve 404 controls flow of concentrate from concentrate vial 401 to vial head 420. Cap concentrate valve 404 is a vacuum-actuated valve that is normally closed, but opens when a vacuum is applied. This occurs when a beverage is being dispensed by beverage dispense 1. Cap concentrate valve 404 therefore ensures that concentrate is only allowed to flow out of concentrate vial 401 during beverage dispensing, which reduces the potential for concentrate leakage.

Vial receptacle 422 also includes a vial head gas valve 426. Vial cap 402 has a matching vial cap gas valve 405. These valves are similar in functionality and are vacuum-actuated normally-closed valves. They both open to connect the interior of concentrate vial 401 with pressurized gas from beverage dispenser 1 during dispensing of a beverage, which causes a vacuum to occur in concentrate vial 401 because of the reduction in concentrate volume. In this way, vial cap gas valve 405 and vial head gas valve 426 reduce gas leakage and prevent the gas system of beverage dispenser 1 from becoming contaminated.

Vial mount 410 has three separate features to retain concentrate vial 401 in vial head 420. First, vial head 420 includes a vial cap receiving features 429 (shown in FIG. 22) that is formed as a cylindrical flange with a recessed cylindrical area immediately under the flange. The flange faces outwards and is above the recessed portion (i.e., the flange is disposed closer to vial cap 402 when concentrate vial 401 is mounted). Vial cap 402 has a corresponding vial head engagement feature 409 that is shaped as an inwards facing flange disposed on an interior surface of vial cap 402. When vial cap 402 is pressed into vial receptacle 422, vial head engagement feature 409 flexes outwards and snaps over vial cap receiving features 429 as vial cap 402 is fully seated in vial head receptacle 422. This action serves to securely retain vial cap 402 in vial head receptacle 422, and also provides a user with a tactile sensation that confirms that concentrate vial 401 is fully seated in vial head receptacle 422.

Figure 20:
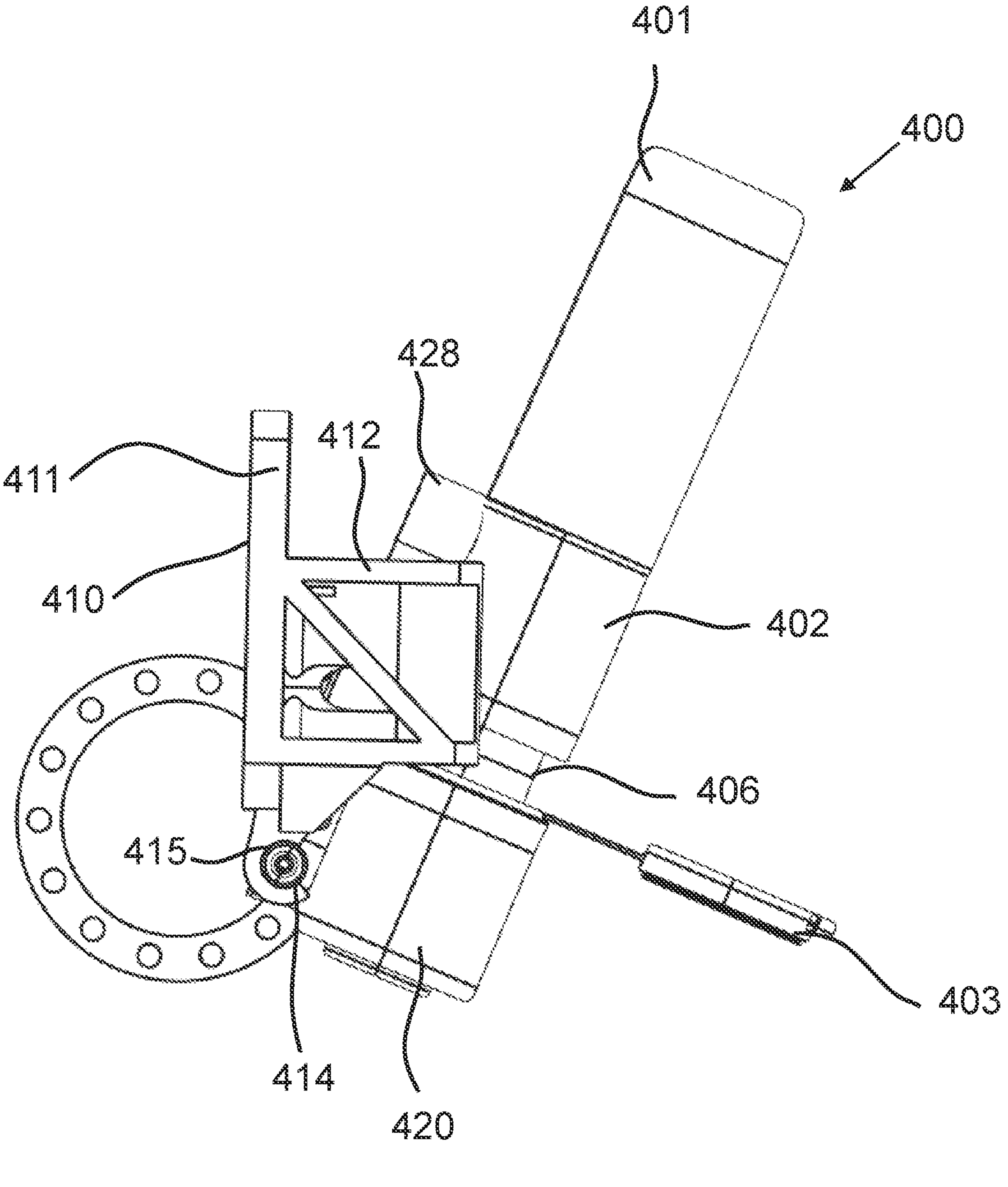
FIG. 20 is a side view of a concentrate vial assembly in a second configuration according to an aspect.
Figure 21:
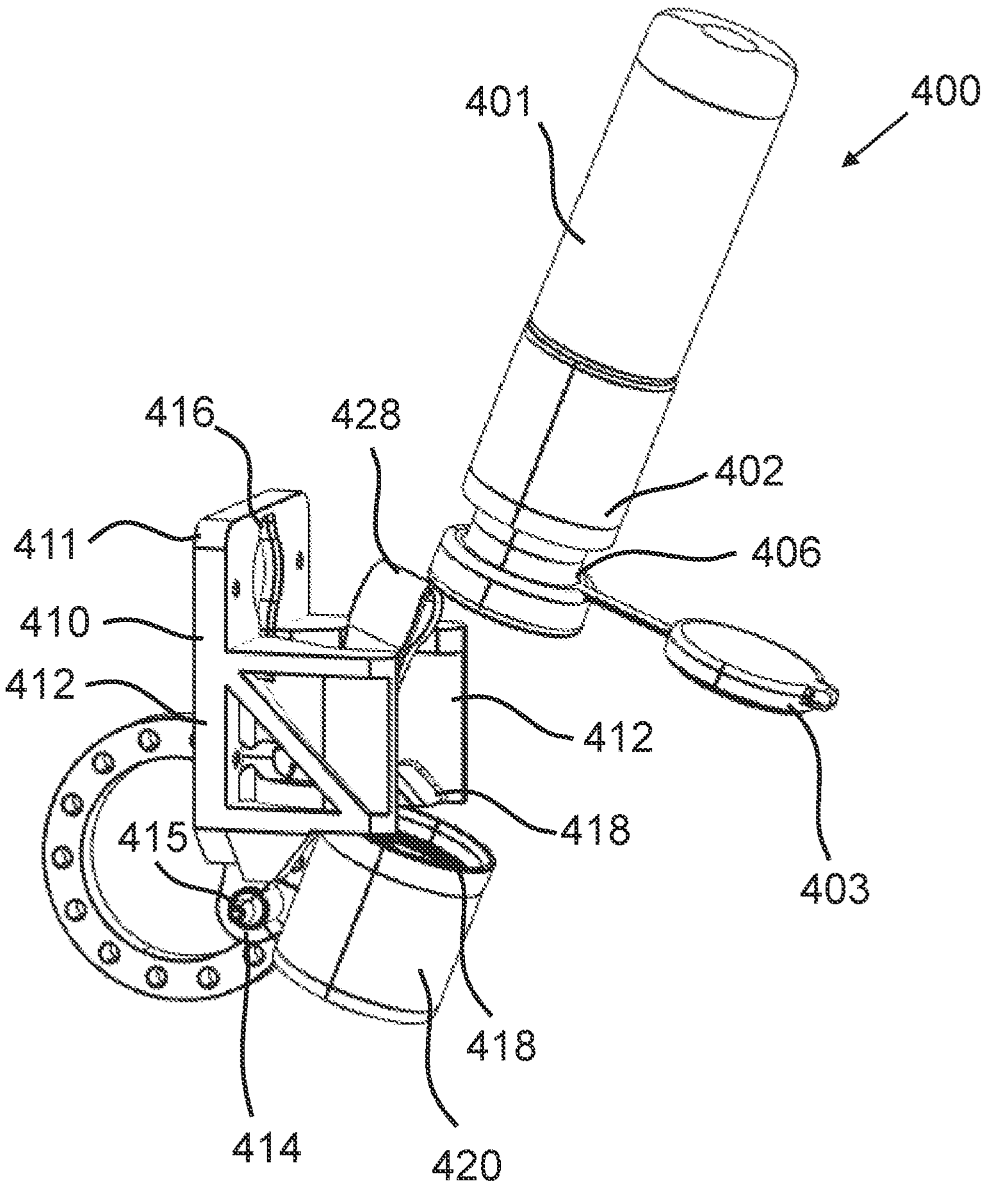
FIG. 21 is a side view of a concentrate vial assembly in a third configuration according to an aspect.
Figure 22:
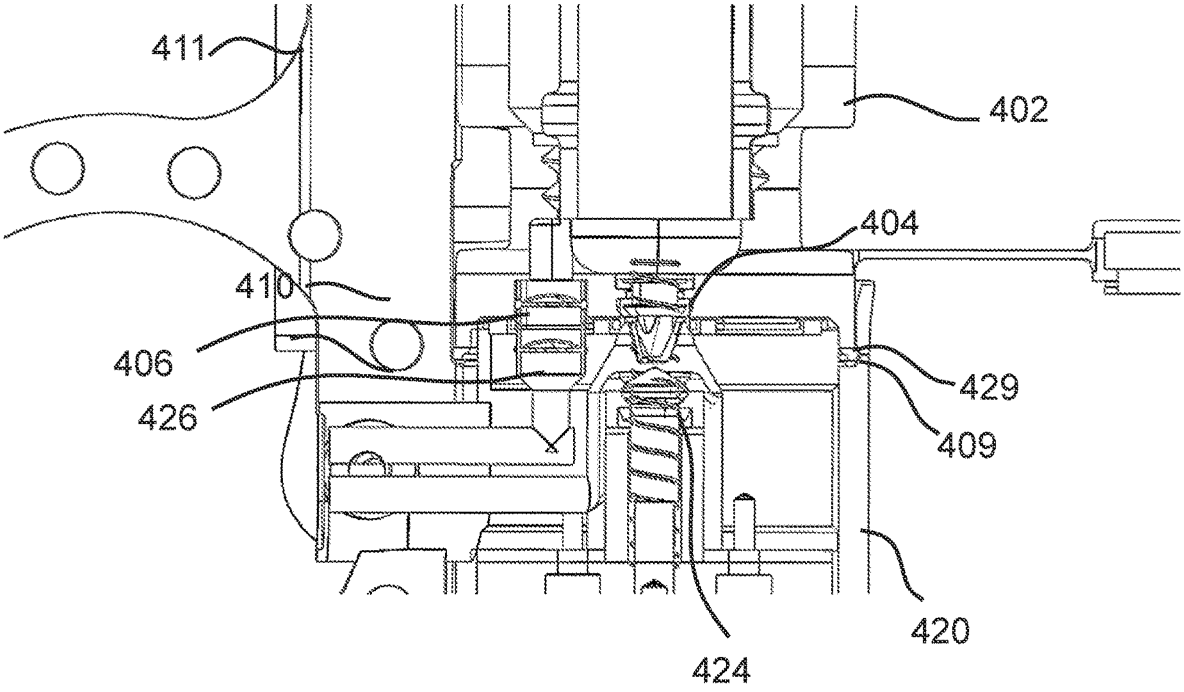
FIG. 22 is a cross-section of a portion of a concentrate vial assembly according to an aspect.

The second retention feature is vial head magnet 428. As shown in FIGS. 17, 20, and 21, vial head magnet 428 is fixed to vial head 420, and thus pivots with vial head 420. A corresponding vial cap magnet 408 is disposed in vial cap 402. When vial cap 402 is fully seated in vial head receptacle 422, vial cap magnet 408 and vial head magnet 428 are aligned and are attracted to each other. This attraction secures vial cap 402 (and, thus, concentrate vial 401) in the proper place with respect to vial head 420. This ensures that vial cap 402 is properly sealing with vial head 420 and also provides additional tactical confirmation of proper seating to the user.

The final retention feature includes a pair of vial cap engagement protrusions 418, each of which is disposed on one of receiving arms 412. Vial cap engagement protrusions 418 extend inwards into the space defined between receiving arms 412, and are configured to be received by vial cap groove 406 disposed in vial cap 402. As concentrate vial 401 is moved from the loading position (FIG. 20) to the closed position (FIG. 19), vial cap engagement protrusions 418 are captured by vial cap groove 406 and restrain vial cap 402 from moving upwards and way from vial head 420. Vial cap engagement protrusions 418 can also be formed to exert a radial force on vial cap groove 406 and thus further provide a retaining force that keeps concentrate vial 401 from moving from the closed position to the loading position.

Figure 19:
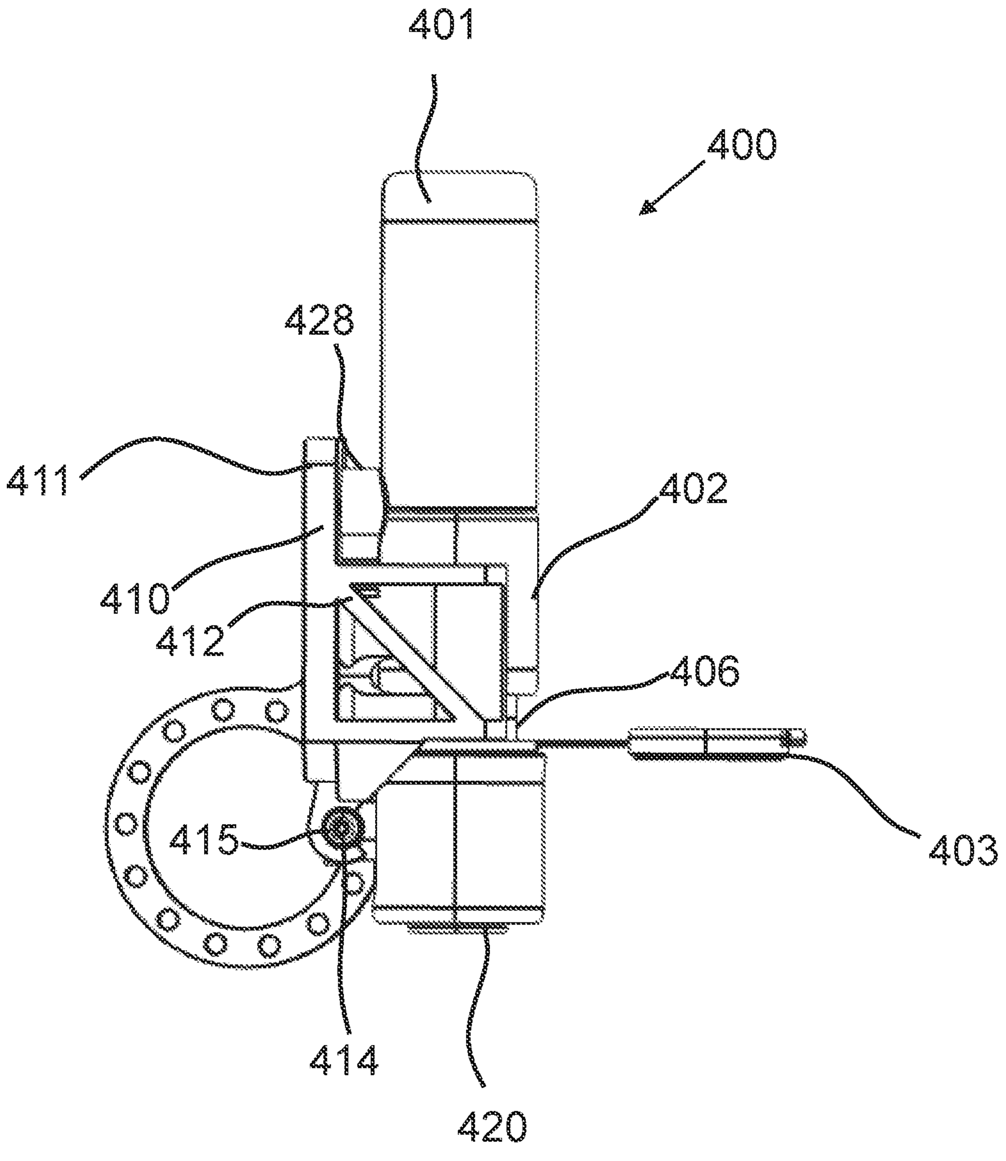
FIG. 19 is side view of a concentrate vial assembly in a first configuration according to an aspect.

The loading position (FIG. 20) may be rotated such that the centerline of concentrate vial 401 forms an angle of between 20 and 60 degrees with the rear surface of vial base 411. In other examples, the loading position may be rotated such that the centerline of concentrate vial 401 forms an angle of between 30 and 45 degrees with the rear surface of vial base 411. The angle associated with the loading position is controlled by interactions between parts of vial head 420 and vial base 411 or by stops incorporated into vial head pivot 414. As shown in FIG. 19, the closed position is located such that the centerline of concentrate vial 401 is approximately parallel to the rear surface of vial base 411.

The elements of vial assembly 400 discussed above can be constructed from any suitable material, including, for example, metal and plastic materials.

A method of replacing concentrate vial 401 in gas cylinder assembly 400 according to the above aspects begins with used concentrate vial 401 being connected to vial assembly 400 in the closed position, as shown in FIGS. 16 and 19. Used concentrate vial 401 is rotated downwards into the loading position (as shown in FIG. 20) by grasping used concentrate vial 401 and pulling downwards. Used concentrate vial 401 is then removed from vial head 420 by pulling concentrate vial 401 away from vial head 420 (see FIG. 21). New concentrate vial 401 is then inserted into vial head 420 until vial head magnet 428 engages vial cap magnet 408. Finally, new concentrate vial 401 is rotated into the closed position (as shown in FIGS. 16 and 19), where receiving arms 412 (and corresponding vial cap engagement protrusions 418) captures vial groove 406, thereby retaining new concentrate vial 401. This service process requires no separate tools, and with practice can be accomplished in only a handful of seconds by an end user.

It is to be appreciated that the Detailed Description section, and not the Summary and Abstract sections, is intended to be used to interpret the claims. The Summary and Abstract sections may set forth one or more but not all exemplary aspects of the present invention(s) as contemplated by the inventors, and thus, are not intended to limit the present invention(s) and the appended claims in any way.

The foregoing description of the specific aspects will so fully reveal the general nature of the invention(s) that others can, by applying knowledge within the skill of the art, readily modify or adapt for various applications such specific aspects, without undue experimentation, and without departing from the general concept of the present invention (s). Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

The breadth and scope of the present invention(s) should not be limited by any of the above-described exemplary aspects, but should be defined only in accordance with the following claims and their equivalents.

What is claimed is:

1. A gas cylinder mount for a beverage dispenser, the gas cylinder mount comprising:

first and second side plates disposed parallel to each other;

a manifold pivotably mounted to the first and second side plates such that the manifold is configured to pivot outwards from the first and second side plates from a closed position into a loading position;

a gas cylinder receptacle disposed in the manifold, the gas cylinder receptacle configured to receive a valve of a gas cylinder;

a gas cylinder receiver linked to the manifold and configured to releasably receive a flange of the gas cylinder; first and second tracks disposed in each of the first and second side plates, respectively; first and second guide protrusions connected to the gas cylinder receiver, each of the first and second guide protrusions received by one of the first and second tracks, respectively, wherein the first and second guide protrusions are configured to move along each of the tracks respectively when the manifold pivots; and a gas regulator disposed in the manifold and configured to selectively fluidly connect an interior of the gas cylinder with the manifold.

2. The gas cylinder mount of claim 1, further comprising, a manifold support plate extending from the manifold; a tensioning assembly fixed to the manifold support plate; and a spring fixed to the tensioning assembly and the gas cylinder receiver such that the receiver is configured to be pushed away from the tensioning assembly and towards the manifold by the spring, wherein the first and second guide protrusions are disposed on the tensioning assembly.

3. The gas cylinder mount of claim 1, wherein the first and second tracks are configured to limit a rotation range of the manifold between the closed position and the loading position to between 30 and 60 degrees as measured by an angle between a centerline of the manifold and a rear of one of the side plates.

4. The gas cylinder mount of claim 1, further comprising a fluid connection configured to fluidly connect the manifold and the beverage dispenser, wherein the fluid connection is coaxially aligned with a pivot connection between the manifold and the first and second side plates.

5. The gas cylinder mount of claim 1, wherein the gas regulator comprises: a gas regulator actuator; and a gas regulator pin linked to the gas regulator actuator such that the gas regulator pin can be extended and retracted by the gas regulator actuator, wherein the gas regulator pin is configured to depress a valve pin disposed in the valve of the gas cylinder when the gas regulator pin is extended to fluidly connect the interior of the gas cylinder with the manifold.

6. The gas cylinder mount of claim 1, wherein the gas cylinder comprises a seal that interfaces with a surface in the receptacle to provide a gas-tight seal between the gas cylinder and the manifold.

* * * * *